United States Patent [19]
Harrison

[11] Patent Number: 6,139,787
[45] Date of Patent: Oct. 31, 2000

[54] METHOD FOR APPLYING MOLDED SILICONE DESIGN ELEMENTS ONTO SUBSTRATES

[75] Inventor: Donald G. Harrison, Houston, Tex.

[73] Assignee: Ubertech Texas, Inc., Houston, Tex.

[21] Appl. No.: 08/736,097

[22] Filed: Oct. 24, 1996

[51] Int. Cl.⁷ .................................................. B29C 39/12
[52] U.S. Cl. ........................ 264/247; 264/251; 264/257; 264/260; 264/265; 264/327
[58] Field of Search .................................. 264/257, 245, 264/132, DIG. 65, 322, 246, 247, 328.2, 328.8, 328.16, 259, 260, 274, 265, 327, 251

[56] References Cited

U.S. PATENT DOCUMENTS

| | | | |
|---|---|---|---|
| 2,241,180 | 5/1941 | Burke | 18/61 |
| 2,279,208 | 4/1942 | Shaw | 18/30 |
| 2,298,365 | 10/1942 | Gits et al. | 18/61 |
| 2,397,743 | 4/1946 | Kaphan | 264/257 |
| 2,485,323 | 10/1949 | Schwartz | 264/245 |
| 2,858,572 | 11/1958 | Burdick | 264/257 |
| 2,926,439 | 3/1960 | Holick . | |
| 2,955,371 | 10/1960 | Brunner | 264/246 |
| 3,042,564 | 7/1962 | Hankins | 264/257 |
| 3,055,133 | 9/1962 | Anderson . | |
| 3,101,994 | 8/1963 | Hartmann | 264/257 |
| 3,107,234 | 10/1963 | Stewart | 260/46.5 |
| 3,122,598 | 2/1964 | Berger | 264/247 |
| 3,137,750 | 6/1964 | Gringras | 264/257 |
| 3,193,435 | 7/1965 | Schafer . | |
| 3,256,626 | 6/1966 | Stoffel . | |
| 3,417,175 | 12/1968 | Brown et al. | 265/245 |
| 3,442,736 | 5/1969 | Duns . | |
| 3,594,262 | 7/1971 | Magidson | 264/257 |
| 3,654,062 | 4/1972 | Loew . | |
| 3,669,415 | 6/1972 | Nielander . | |
| 3,705,935 | 12/1972 | Francis et al. . | |
| 3,861,955 | 1/1975 | Lemelson . | |

(List continued on next page.)

FOREIGN PATENT DOCUMENTS

| | | |
|---|---|---|
| 1319234 | 6/1993 | Canada . |
| 2717739 | 9/1995 | France . |
| 23 56 004 | 11/1973 | Germany . |
| 23 26 971 B 2 | 3/1977 | Germany . |
| 28 27 149 A 1 | 1/1979 | Germany . |
| 85 33 472 U | 3/1986 | Germany . |
| 39 38 966 A 1 | 5/1991 | Germany . |
| 41 32 476 A 1 | 4/1993 | Germany . |
| 6-158527 | 6/1994 | Japan . |
| 2 047 126 | 11/1980 | United Kingdom . |
| 2 241 191 | 6/1991 | United Kingdom . |
| WO 91/10007 | 7/1991 | WIPO . |
| WO 91/12365 | 8/1991 | WIPO . |
| WO 96/24490 | 8/1996 | WIPO . |

OTHER PUBLICATIONS

Hayes, W. R., "A New Liquid Processing System for Making Silicone Rubber Parts," *Proceedings of the International Rubber Conference 1979*, pp. 821–827, Venice, Italy, Oct. 3–6, 1979 (Translation provided).

(List continued on next page.)

*Primary Examiner*—Jan H. Silbaugh
*Assistant Examiner*—Stefan Staicovici
*Attorney, Agent, or Firm*—Mandan, Mossman & Sriram, P.C.

[57] ABSTRACT

A method for applying molded silicone design elements onto substrates is provided. The apparatus and method of the present invention use a cold-mold injection molding process to apply molded silicone design elements onto substrates, including delicate substrates such as fabrics and paper. A cold-mold injection molding process is used to avoid tearing, burning or otherwise damaging the substrates. The molded silicone design elements are preferably multi-colored and three-dimensional. The design elements may include foreground elements and background elements of varying colors and dimensions, which together form an overall artistic design in relief. The molded silicone design elements may also be textured.

10 Claims, 12 Drawing Sheets

U.S. PATENT DOCUMENTS

| | | | |
|---|---|---|---|
| 3,890,679 | 6/1975 | Simon . | |
| 3,934,064 | 1/1976 | Lowthian | 264/257 |
| 4,008,100 | 2/1977 | Sundberg et al. | 264/257 |
| 4,205,035 | 5/1980 | Trame | 264/132 |
| 4,264,386 | 4/1981 | Sears, Jr. et al. . | |
| 4,573,216 | 3/1986 | Wortberg . | |
| 4,631,210 | 12/1986 | McGee et al. . | |
| 4,645,629 | 2/1987 | Stern . | |
| 4,657,419 | 4/1987 | Takakuwa | 264/245 |
| 4,668,450 | 5/1987 | Blochl et al. | 264/132 |
| 4,686,766 | 8/1987 | Dubbs et al. . | |
| 4,693,769 | 9/1987 | Fritz et al. . | |
| 4,709,443 | 12/1987 | Bigley . | |
| 4,710,145 | 12/1987 | Hall Vandis . | |
| 4,292,263 | 9/1981 | Hanrahan et al. . | |
| 4,356,617 | 11/1982 | Coscia | 264/132 |
| 4,370,115 | 1/1983 | Miura . | |
| 4,370,123 | 1/1983 | Dannels et al. | 264/328.2 |
| 4,418,031 | 11/1983 | Doerer et al. | 264/257 |
| 4,442,055 | 4/1984 | Oelsch et al. | 264/105 |
| 4,481,160 | 11/1984 | Bree . | |
| 4,484,360 | 11/1984 | Leighton et al. . | |
| 4,484,361 | 11/1984 | Leighton et al. . | |
| 4,493,865 | 1/1985 | Kuhlmann et al. . | |
| 4,494,247 | 1/1985 | Kelly . | |
| 4,530,874 | 7/1985 | Hendrix et al. . | |
| 4,732,724 | 3/1988 | Sterner | 264/251 |
| 4,806,391 | 2/1989 | Shorin . | |
| 4,810,444 | 3/1989 | Alberino et al. | 264/257 |
| 4,810,559 | 3/1989 | Fortier et al. . | |
| 4,815,149 | 3/1989 | Erhardt et al. . | |
| 4,818,829 | 4/1989 | Nopper et al. . | |
| 4,837,864 | 6/1989 | Thill . | |
| 4,838,965 | 6/1989 | Bussard . | |
| 4,849,145 | 7/1989 | Hirsch . | |
| 4,876,805 | 10/1989 | Peoples . | |
| 4,889,668 | 12/1989 | Kemp | 264/257 |
| 4,910,886 | 3/1990 | Sullivan et al. . | |
| 4,922,929 | 5/1990 | DeJournett . | |
| 4,923,848 | 5/1990 | Akada et al. . | |
| 4,926,502 | 5/1990 | Miyamura . | |
| 4,933,120 | 6/1990 | D'Amato et al. . | |
| 4,940,563 | 7/1990 | Kromrey | 264/257 |
| 4,956,040 | 9/1990 | Fry . | |
| 4,963,208 | 10/1990 | Muncy et al. . | |
| 4,982,447 | 1/1991 | Henson . | |
| 4,987,613 | 1/1991 | Loverdi et al. . | |
| 5,000,902 | 3/1991 | Adams | 264/245 |
| 5,005,219 | 4/1991 | Diaz . | |
| 5,014,354 | 5/1991 | Dumont . | |
| 5,014,358 | 5/1991 | Matumori . | |
| 5,033,939 | 7/1991 | Brasel . | |
| 5,048,123 | 9/1991 | Monson . | |
| 5,065,475 | 11/1991 | Watt . | |
| 5,073,222 | 12/1991 | Fry . | |
| 5,075,899 | 12/1991 | Funahashi et al. . | |
| 5,087,193 | 2/1992 | Herbert, Jr. . | |
| 5,093,067 | 3/1992 | Gibson . | |
| 5,101,580 | 4/1992 | Lyden . | |
| 5,139,566 | 8/1992 | Zimmerman . | |
| 5,146,628 | 9/1992 | Herrmann et al. . | |
| 5,151,239 | 9/1992 | King, Jr. . | |
| 5,153,007 | 10/1992 | Watkins . | |
| 5,168,576 | 12/1992 | Krent et al. . | |
| 5,173,968 | 12/1992 | Fox . | |
| 5,188,981 | 2/1993 | Stiles et al. . | |
| 5,200,263 | 4/1993 | Gould et al. . | |
| 5,205,892 | 4/1993 | Gagliani et al. . | |
| 5,210,877 | 5/1993 | Newman . | |
| 5,229,144 | 7/1993 | Kuntz . | |
| 5,236,324 | 8/1993 | Konieczny et al. . | |
| 5,241,919 | 9/1993 | LaGreca . | |
| 5,281,499 | 1/1994 | Bussard . | |
| 5,296,182 | 3/1994 | Thary . | |
| 5,304,547 | 4/1994 | Mentink et al. . | |
| 5,309,840 | 5/1994 | Takamura et al. . | |
| 5,314,767 | 5/1994 | Bussard . | |
| 5,316,820 | 5/1994 | Harpell et al. . | |
| 5,328,652 | 7/1994 | Thomson . | |
| 5,337,418 | 8/1994 | Kato et al. . | |
| 5,362,349 | 11/1994 | Zoller . | |
| 5,364,387 | 11/1994 | Sweeney . | |
| 5,364,584 | 11/1994 | Imanara et al. . | |
| 5,368,930 | 11/1994 | Samples . | |
| 5,398,345 | 3/1995 | Kenneth et al. . | |
| 5,405,312 | 4/1995 | Jacobs . | |
| 5,418,980 | 5/1995 | Kelly . | |
| 5,419,475 | 5/1995 | Naritomi . | |
| 5,423,087 | 6/1995 | Krent et al. . | |
| 5,435,007 | 7/1995 | Kalvestran et al. . | |
| 5,455,129 | 10/1995 | Bussard . | |
| 5,460,873 | 10/1995 | Ogawa et al. . | |
| 5,487,861 | 1/1996 | Reeder et al. . | |
| 5,494,621 | 2/1996 | Sugisaki et al. . | |
| 5,510,911 | 4/1996 | Sharpe et al. . | |
| 5,542,171 | 8/1996 | Juskey et al. . | |
| 5,545,128 | 8/1996 | Hayes et al. . | |
| 5,551,082 | 9/1996 | Stewart et al. . | |
| 5,718,326 | 2/1998 | Larose et al. | 200/314 |

OTHER PUBLICATIONS

Hegele, K., "Eight–Cavity Injection Moulds for Manufacturing Bellows of Silicone Rubber," *Kunststoffe 74* (1984) 12, pp. 714–715 (Translation provided).

Romig, C. A., "Automatic Preparation of Silicone–Rubber Parts," *GAK Aug. 1995—Issue 38,* pp. 408–409 (Translation Provided).

Weise, G., "HTV Liquid Silicone Rubber for the Production of Form Parts in the Injection–Molding Process—an Economic Alternative," *German Rubber Days,* Jun. 13–16, 1983 (Translation provided).

METHOD FOR APPLYING MOLDED SILICONE DESIGN ELEMENTS ONTO SUBSTRATES

BACKGROUND OF THE INVENTION

The present invention relates generally to an apparatus and a method for decorating substrates such as textiles or paper with design elements. More particularly, the present invention relates to an apparatus and a method for applying molded silicone design elements onto substrates using a cold-mold injection molding process that allows such molded silicone design elements to be applied to relatively delicate substrates without burning, tearing or otherwise damaging the substrates.

Various methods have been used for decorating substrates such as fabrics that are used to make garments. Silk-screening is one such method. Silk-screening is a process that is commonly used to print flat, color designs through silk onto substrates such as T-shirts and sweatshirts. The process typically involves the use of a squeegee to push ink of a particular color through a tightly stretched silk screen onto the substrate. The screen has openings in areas that correspond to the areas of substrate that are intended to receive the ink of the particular color. The other areas of the screen are blocked with a resin.

Although silk-screening can be used to create multi-colored designs on substrates such as garments, the process requires a separate squeegee step for each color used in the design. Each silk screen (except the first) must be properly aligned with the image created with the previous screen or screens. Silk-screening can thus be a complex, time-consuming process when several colors are used. In addition, the designs created by silk-screening are generally flat and not textured. Although some elevation can be achieved using specialized inks that "puff" when they dry, this elevation tends to be modest.

Embroidery is another process that is used to decorate fabrics. Embroidery is typically performed by a machine that applies stitching of various colors to the fabric to create a design. However, a separate stitching step is required for each color in the design. Like silk screening, the designs created by embroidery are not three-dimensional. The texture of the embroidered designs is limited to the texture of the stitching used to create the design.

Another method for decorating garments involves attaching appliques made of felt, wool, plastic, rubber or other materials to the garments. Appliques may be multi-colored and three-dimensional, and they are generally heat-sealed, glued or sewn to the garments. However, the transition between the applique and the garment generally has a noticeably discontinuous appearance. In addition, the attachment mechanism (e.g., stitching, glue, heat-seal) tends to wear over time which causes the applique to lift away from the garment. Appliques also tend to fray over time.

In view of the foregoing, it would be desirable to provide an apparatus and a method for securely applying a design element onto a substrate.

It would also be desirable to provide an apparatus and a method for securely applying a multi-colored design element onto a substrate.

It would further be desirable to provide an apparatus and a method for securely applying a three-dimensional design element onto a substrate.

It would still further be desirable to provide an apparatus and a method for securely applying a textured design element onto a substrate.

SUMMARY OF THE INVENTION

It is an object of this invention to provide an apparatus and a method for securely applying a design element onto a substrate.

It is another object of this invention to provide an apparatus and a method for securely applying a multi-colored design element onto a substrate.

It is a further object of this invention to provide an apparatus and a method for securely applying a three-dimensional design element onto a substrate.

It is a still further object of this invention to provide an apparatus and a method for securely applying a textured design element onto a substrate.

In accordance with this invention, an apparatus and a method for applying molded silicone design elements onto substrates are provided. The apparatus and method of this invention are particularly suitable for use in applying molded silicone design elements onto delicate substrates, including fabrics and paper. The apparatus and method of this invention may be used to apply molded silicone design elements onto such delicate substrates without burning, tearing, or otherwise damaging the substrates. The apparatus and method of this invention avoid such damage to the substrates by using a cold-mold injection molding process to apply the molded silicone design elements onto the substrates.

The molded silicone design elements created in accordance with this invention are preferably multi-colored and three-dimensional. The design elements may include foreground design elements and background design elements of varying colors and dimensions, which together form an overall artistic design in relief. The design elements may also be textured.

To apply a molded silicone design element onto a substrate using the apparatus and method of the present invention, a user first places the substrate onto a horizontally oriented backplate. The backplate is adapted to receive a substrate of a particular type. For example, the backplate may be shaped like a human torso to facilitate placement of a T-shirt or sweatshirt on the backplate. An upwardly facing surface of the substrate is the surface that is intended to receive the molded silicone design element during the injection molding process.

The backplate includes a heating plate that is surrounded by a water-cooled perimeter plate that remains relatively cool during the injection molding process. The heating plate is preferably at least as large as the molded silicone design element that is to be applied to the substrate. The heating plate heats a region of the substrate that is intended to receive the molded silicone design element.

The apparatus of the present invention also includes an air cylinder that is vertically aligned with the backplate. The air cylinder is capable of moving vertically, under the control of a control system, between the backplate and a position about 12 inches above the backplate. A manifold is attached to the lower end of the air cylinder. The manifold receives liquid injection molding ("LIM") silicone through flowlines which are coupled to sources of silicone, with each flowline providing silicone of a particular color.

An upper plate of a three-plate injection mold is securely fastened to the lower surface of the manifold. When the manifold is in its elevated position, the center and lower plates of the three-plate injection mold can be placed against the upper plate that is attached to the manifold. The center and lower plates are held in place by a vacuum that is controlled by the control system. The lower plate may include a plurality of open cavities that define the shape of the three-dimensional molded silicone design element to be applied to the substrate. The openings of the cavities face the substrate. A series of gated runners in the three-plate injection mold define the distribution of silicone of various colors into the cavities of the lower plate of the three-plate injection mold.

The apparatus of the present invention further includes a water-cooled cure unit that moves along pneumatic, rodless cylinders under the control of the control system. The cure unit can move horizontally between a first position about two feet away from the backplate and a second position that is between and in vertical alignment with the manifold (in its raised position) and the backplate.

After the substrate is properly positioned on the backplate and the center and lower mold plates are placed against the upper mold plate, the operator actuates the control system to cause the apparatus to begin the process of applying the molded silicone design element onto the substrate. The control system lowers the air cylinder to place the three-plate mold into tight engagement with the substrate. The control system then actuates silicone inject units that cause "shots" of silicone of different colors to be injected into the three-plate injection mold via the flowlines and the manifold. The volume of the silicone shots is regulated by the control system in accordance with the parameters entered by the operator to ensure complete filling of the three-plate mold without overfilling. The silicone shots are injected into the mold at low pressure (e.g., in the range from about 25 to about 200 psi, preferably about 75 psi) to avoid introducing mechanical defects (e.g., tears) into the substrate.

The three-plate injection mold is maintained at a temperature that is below the curing temperature of silicone as the three-plate mold is being injected with silicone, to avoid premature curing of the silicone and burning of the substrate. However, the heating plate in the backplate provides just enough heat from beneath the substrate to cause the silicone at the substrate-silicone interface to cure quickly. This prevents excessive bleeding of the silicone through the substrate prior to complete curing of the silicone.

After the three-plate injection mold has been completely filled with silicone, the control system releases the vacuum and causes the air cylinder to retract to its elevated position, leaving the center and lower mold plates filled with substantially uncured silicone on the substrate. The control system then moves the cure unit to a position between the manifold and the backplate, and then causes the air cylinder to lower to press a heating plate of the cure unit against the center mold plate to cure the silicone. The control system then retracts the air cylinder and the cure unit after a predetermined period of time (i.e., a period of time sufficient to provide enough heat to the center and lower mold plates to cure the silicone) has lapsed. After cooling, the center and lower mold plates can be removed from the substrate leaving a molded silicone design element secured to the substrate.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENT

Figure 1:
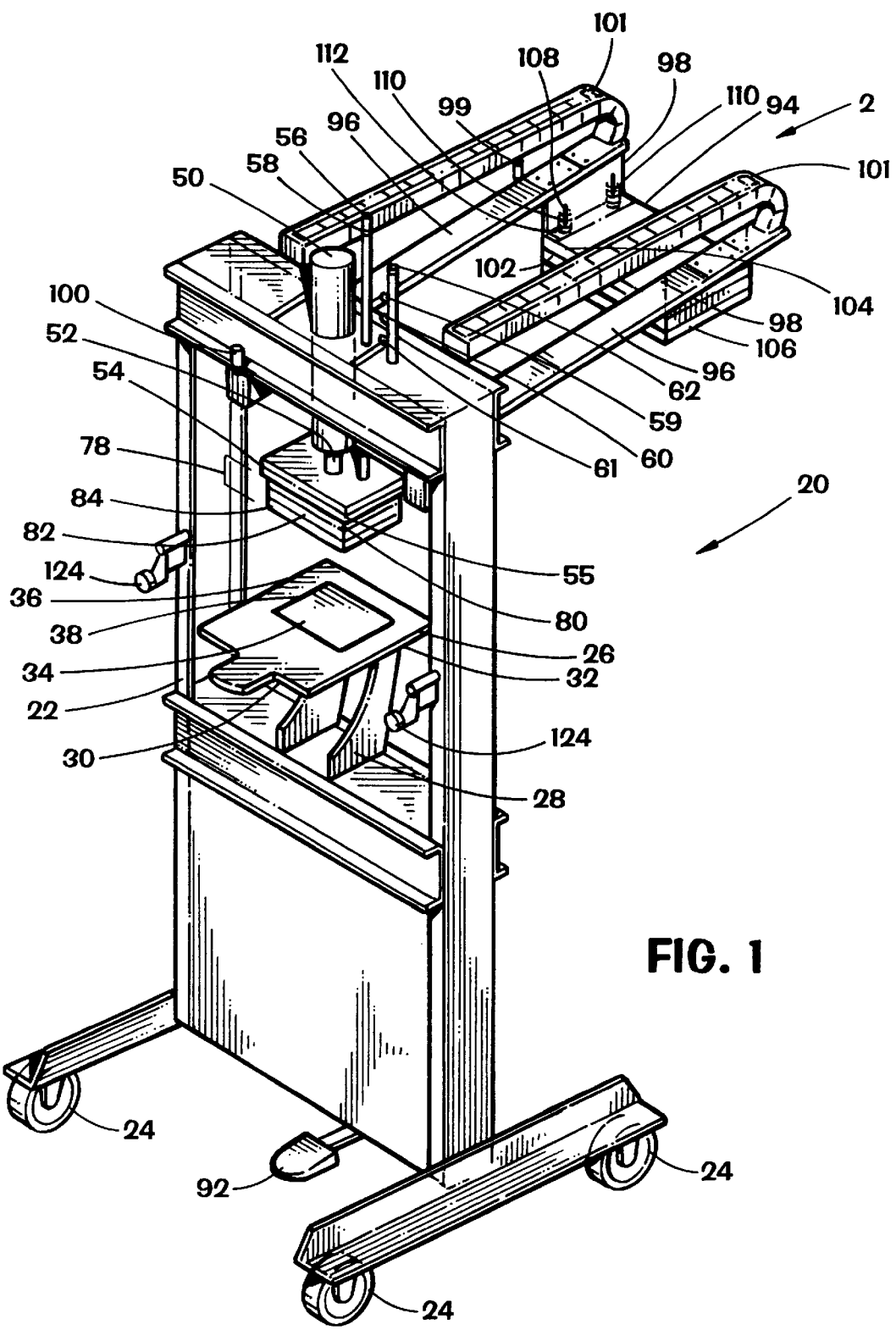
FIG. 1 is a perspective view of an apparatus for applying molded silicone design elements onto substrates in accordance with the principles of the present invention.
Figure 2:
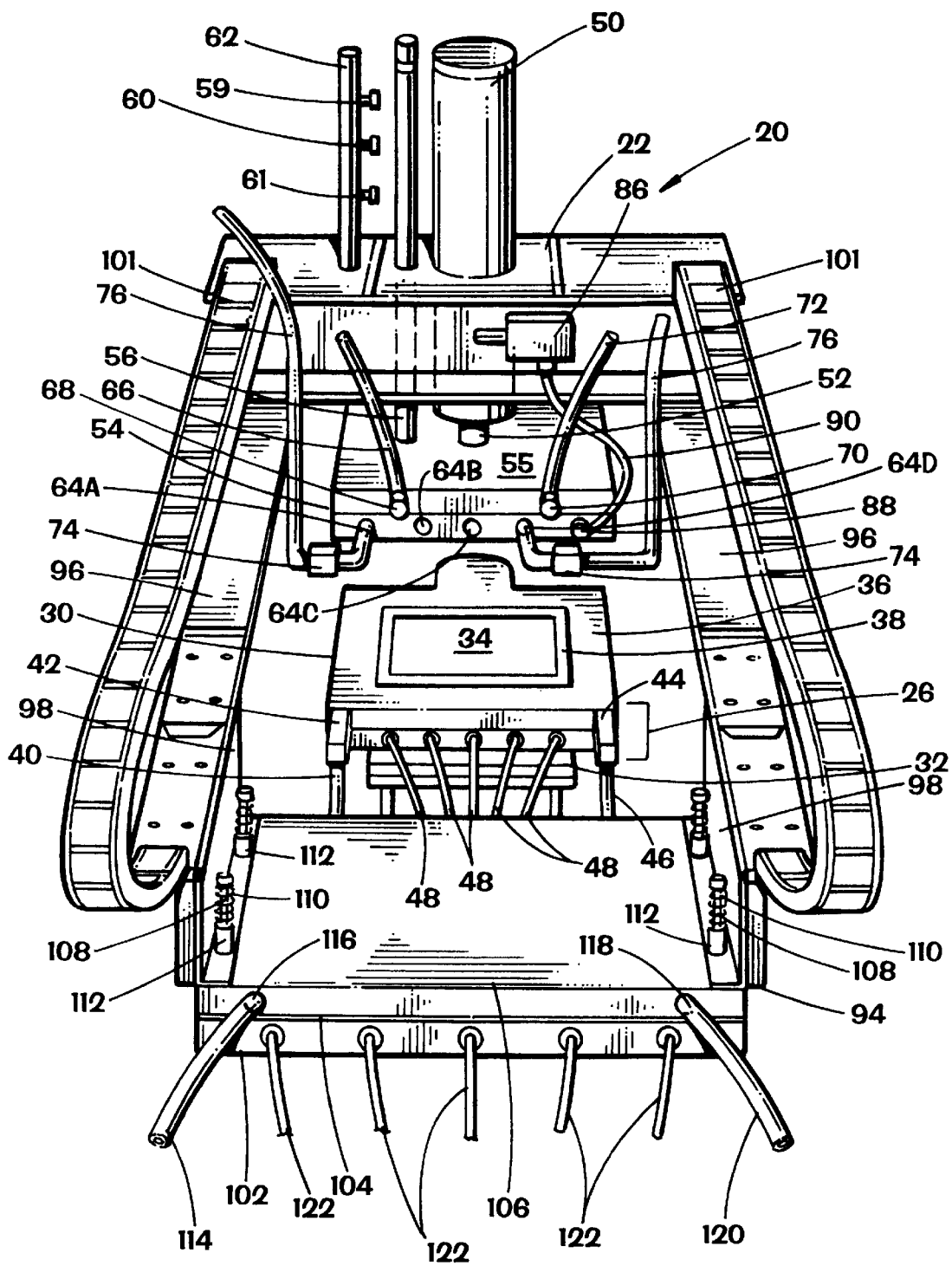
FIG. 2 is another perspective view of the apparatus shown in FIG. 1 as seen from the perspective indicated by the line 2 of FIG. 1.

Referring first to FIGS. 1 and 2, an injection molding apparatus 20 for applying molded silicone design elements onto substrates is described. The apparatus 20 performs a cold-mold injection process that can be used to apply molded silicone design elements onto various types of substrates, including delicate substrates such as fabrics and paper, without burning, tearing or otherwise damaging the substrates.

The apparatus 20 can be used to apply molded silicone design elements onto various types of substrates including, for example, T-shirts, sweatshirts, jackets, caps, bags and pants made of any natural or synthetic fabric. The apparatus 20 can also be used to apply molded silicone design elements onto paper products including, for example, stationary, cardboard, book covers and hangtags.

The apparatus 20 includes a steel frame 22 that serves as a support for the components of the apparatus 20. A plurality of casters 24 are bolted to the bottom of the frame 22 to facilitate movement of the apparatus 20 in a production environment.

The apparatus 20 includes a backplate assembly 26 that is attached to the frame 22 by a steel backplate support 28. The backplate assembly 26 includes a water-cooled, heated backplate 30 and an insulating layer 32 that minimizes thermal conduction from the backplate 30 to the backplate support 28. The backplate 30 is preferably adapted to receive and hold a substrate of a particular type onto which a molded silicone design element is to be applied using the apparatus 20. For example, the backplate 30 is shaped to receive and securely hold a T-shirt or a sweatshirt while the apparatus 20 applies a molded silicone design element onto the T-shirt or sweatshirt in the manner described below. The backplate 30 can be replaced with other backplates having shapes that are more suitable for use with other types of substrates such as pants, caps and jackets. Backplates of various sizes may be used to accommodate substrates of different sizes. For example, smaller backplates may be used for children's clothing.

The backplate 30 includes a central heating plate 34 that is surrounded by a water-cooled perimeter plate 36. The heating plate 34 and the perimeter plate 36 are both preferably made of steel or aluminum. The heating plate 34 is preferably maintained at a temperature in the range of 200 to 600 degrees F. while the apparatus 20 is being used to apply molded silicone design elements onto substrates. A temperature of about 400 degrees F. has been found to be suitable for the heating plate 34 when the apparatus 20 is used to apply molded silicone design elements onto fabrics such as cotton T-shirts and sweatshirts. The position of the heating plate 34 in the backplate 30 is selected so that when an operator places a substrate on the backplate 30, the heating plate 34 is aligned with a region of the substrate that is intended to receive a molded silicone design element. The heating plate 34 provides heat from the lower surface of the substrate (i.e., the surface that is placed in direct contact with the backplate 30) to facilitate curing of silicone that is applied to the upper surface of the substrate to form a molded silicone design element.

An insulating layer 38 is disposed between the heating plate 34 and the perimeter plate 36 to minimize thermal conduction between the heating plate 34 and the border plate 36. The insulating layer 38 also serves as a condensation barrier. Cold water flows through conduits (not shown) in the perimeter plate 36 to maintain the perimeter plate 36 substantially at room temperature. The cold water is supplied by a hose 40 which is connected at one end to a source of cold water (not shown). The hose 40 supplies the cold water to the backplate 30 through a water input port 42. The water leaves the backplate 30 through a water output port 44. A hose 46 carries the water away from the backplate 30 to a drain (not shown) or a water recycling unit (not shown). The water-cooled perimeter plate 36 provides a cool work surface that allows the operator to place substrates on and remove substrates from the backplate 30 without having to touch the heating plate 34.

A plurality of electrical wires 48 are connected to the backplate 30. The electrical wires 48 supply power to the heating plate 34 and are used to regulate the temperature of the heating plate 34. The heating plate 34 may include a plurality of separate heating elements (not shown). In this example, four heating elements (not shown) are used.

The apparatus 20 also includes an air cylinder 50 that is secured to the top of the frame 22 using bolts. An air cylinder that is suitable for this purpose is the 1.50DXSR6 air cylinder available from Parker Hannifin Cylinder Division located in Des Plains, Ill. A cylinder rod 52 is disposed within the air cylinder 50. A water-cooled manifold 54 is attached to the lower end of the cylinder rod 52. The air cylinder 50 is capable of moving the manifold 54 between a raised position (as shown in FIGS. 1 and 2) and a lowered position near the backplate 30. A positioning rod 56 is also attached to the manifold 54. The positioning rod 56 moves vertically in accordance with any movement of the manifold 54. A metal ring 58 is attached to the top of the positioning rod 56. The position of the metal ring 58 is detected by three proximity sensors 59, 60 and 61 attached to a metal rod 62 that is secured to the top of the frame 22. A proximity sensor that is suitable for this purpose is the BI-M12-AD4X proximity sensor available from Turk located in Minneapolis, Minn. The proximity sensors 59, 60 and 61 thus provide an indication of the position of the manifold 54 as it is moved vertically by the air cylinder 50.

The manifold 54 receives liquid injection molding ("LIM") silicone of a plurality of colors through a plurality of silicone input ports 64a–64d located on a side 65 of the manifold 54. The apparatus 20 is thus capable of applying multi-colored molded silicone design elements onto substrates. Silicones that are suitable for use in applying molded silicone design elements onto substrates in accordance with this invention include LIM3745 silicone available from General Electric Corp. located in Waterford, N.Y. Other silicones selected from the General Electric Corp. 6000 LIM series having a durometer rating in the range of 20 to 60 may also be used. It may be desirable to use a silicone that contains adhesives, particularly when molded silicone design elements are to be applied onto substrates with insubstantial weaves (e.g., nylon). A combination of SS4155 adhesion primer and 89028 adhesion promoter, both available in silicone provided by General Electric Corp., can be used for this purpose. As shown in FIG. 2, the manifold 54 is configured to receive silicone of four different colors through four silicone input ports 64a–64d. It should be understood, however, that the number of colors can be increased by increasing the number of silicone input ports. The size of the manifold 54 may be increased to accommodate more silicone input ports.

Like the backplate 30, the manifold 54 is water cooled. The cold water is supplied to a cooling plate 55 of the manifold 54 by a hose 66 which is connected at one end to a source of cold water (not shown). The hose 66 supplies the cold water to conduits (not shown) in the cooling plate 55 through a water input port 68. The water leaves the cooling plate 55 through a water output port 70. A hose 72 carries the water away from the cooling plate 55 to a drain (not shown) or a water recycling unit (not shown). The flow of cold water through the cooling plate 55 retards curing of silicone in the manifold 54.

In FIG. 2, the silicone input ports 64a and 64d are shown to be connected to sources of silicone. Each of the silicone input ports 64a and 64d is connected to a pneumatic ball valve 74 which regulates the amount of silicone (i.e., the "shot" size) injected into the manifold 54 for a particular color of silicone. A ball valve which is suitable for this purpose is the XV502-P4-000 ball valve available from Parker Hannifin Cylinder Division. A control system (described below in connection with FIG. 13) controls the opening and closing of the ball valves 74 by regulating air pressure supplied to the ball valves 74 through air flowlines (not shown).

Each ball valve 74 receives silicone of a particular color through a flowline 76 that is connected to a color silicone inject unit (not shown). A silicone inject unit that is suitable for this purpose is the 5GPI-I silicone inject assembly available from RJS Precision Products, Inc. located in Latham, N.Y. Each silicone inject unit (not shown) preferably injects silicone into the manifold 54 at an injection pressure in the range from about 25 to about 200 psi, preferably about 75 psi. Each color silicone inject unit (not shown) receives two silicone components and a dye from a silicone pump unit (not shown). A silicone pump unit that is suitable for this purpose is the 5GP600-I silicone meter/mix pump also available from RJS Precision Products, Inc. Each silicone inject unit (not shown) mixes the silicone components and injects a measured shot of silicone of a particular color into the attached flowline 76.

A three-plate mold assembly 78 comprising an upper mold plate 80, a center mold plate 82 and a lower mold plate 84 is shown in FIG. 1 to be attached to the lower surface of the manifold 54. Each of the mold plates of the mold assembly 78 is preferably made of aluminum. The upper mold plate 80 is preferably bolted to the lower surface of the manifold 54. The center mold plate 82 and the lower mold plate 84 are held together against the lower surface of the upper mold plate 80 by a vacuum 86. The vacuum 86 is connected to a vacuum input port 88 on the manifold 54 by a vacuum tube 90. The lower surface of the manifold 54 has a vacuum output port (not shown) that registers with a port (not shown) in the upper mold plate 80 to establish the suction needed to hold the center mold plate 82 and the lower mold plate 84 against the upper mold plate 80. A vacuum that is suitable for this purpose is the CVA-D vacuum manufactured by Myotohu Ltd. and available from Con Vum International Corp. located in Torrence, Calif. A foot pedal 92 is used by the operator to actuate the vacuum 86.

The upper mold plate 80 receives, through silicone output ports (not shown) located on the lower surface of the manifold 54, the silicone of various colors that is injected into the manifold 54 through the ball valves 74. Exposed cavities (not shown) are formed in the lower surface of the lower mold plate 84, the exposed cavities defining the shapes and dimensions of the molded silicone design element that is to be applied to the substrate. The lower surface of the lower mold plate 84 tightly engages the substrate that is placed on the backplate 30 when the air cylinder 50 lowers the manifold 54. The mold assembly 78 includes a gated runner system (not shown) that distributes the silicone of various colors to desired cavities in the lower mold plate 84. The runner system allows different mold cavities in the lower mold plate 84 to be filled with silicone of different colors without cross-contamination of colors.

The apparatus 20 further includes a sliding cure unit 94 that is attached to pair of pneumatic, rodless cylinders 96 by a pair of Z-brackets 98. Each rodless cylinder 96 is bolted at one end to the frame 22. The cure unit 94 moves along the lengths of the rodless cylinders 96 in response to air pressure supplied to the rodless cylinders 96 through air flowlines (not shown) coupled to each end of the rodless cylinders 96. The air pressure is controlled by a control system described below in connection with FIG. 13.

The cure unit 94 may be moved by the rodless cylinders 96 from a first position about two feet from the frame 22 (as shown in FIGS. 1 and 2) to a second position that is between and in vertical alignment with the manifold 54 and the backplate 30. A rodless cylinder that is suitable for this purpose is the FW250777A rodless cylinder available from Parker Hannifin Cylinder Division. A pair of proximity switches 99 and 100 provide an indication of the position of the cure unit 94. A proximity sensor that is suitable for this purpose is the BI-M12-AD4X proximity sensor available from Turk.

A pair of cable carriers 101 are connected between the top of the frame 22 and the ends of the Z-brackets 98 that are further from the frame 22. The cable carriers 101 contain water hoses (not shown) and electrical wiring (not shown) that are used by various components of the apparatus 20. The cable carriers 101 are capable of expanding and contracting as the cure unit 94 slides along the rodless cylinders 96. The cable carriers 101 thus prevent tangling and breakage of the electrical wiring (not shown) and water hoses (not shown) as the cure unit 94 moves along the rodless cylinders 96. A cable carrier that is suitable for this purpose is the 30-1075 cable carrier available from Igus located in East Providence, R.I.

The cure unit 94 includes a heating plate 102, an insulating layer 104, and a cooling plate 106. The heating plate 102, the insulating layer 104 and the cooling plate 106 are bolted together. The cooling plate 106 is attached to the Z-brackets 98 by a set of four pins 108 that are disposed within a corresponding set of four heavy duty springs 110 and a set of four bushings 112. Each side of the cure unit 94 is attached to one of the Z-brackets 98 by a pair of pins 108, springs 110 and bushings 112. The set of four pins 108, springs 110 and bushings 112 allows the cure unit 94 to be urged downward under force applied to the upper surface of the cooling plate 106, and to retract to a resting position (as shown in FIGS. 1 and 2) when the force is removed.

The cooling plate 106 is water cooled in a manner similar to that described above in connection with the backplate 30 and the cooling plate 55 of the manifold 54. Cold water is supplied by a hose 114 which is connected at one end to a source of cold water (not shown). The hose 114 supplies the cold water to conduits (not shown) in the cooling plate 106 through a water input port 116. The water leaves the cooling plate 106 through a water output port 118. A hose 120 carries the water away from the cooling plate 106 to a drain (not shown) or a water recycling unit (not shown). The cooling plate 106 and the insulating layer 104 serve to prevent heat from being transferred from the heating plate 102 to the manifold 54 while the silicone is curing.

A plurality of electrical wires 122 are connected to the heating plate 102. The electrical wires 122 are used to supply power to the heating plate 102 and to regulate the temperature of the heating plate 102. Like the heating plate 34, the heating plate 102 may include a plurality of separate heating elements (not shown). In this example, four heating elements (not shown) are used.

The heating plate 102 is preferably maintained at a temperature in the range of 200 to 600 degrees F. while the apparatus 20 is being used to apply molded silicone design elements onto substrates. A temperature of about 400 degrees F. has been found to be suitable for the heating plate 102 when the apparatus 20 is used to apply molded silicone design elements onto fabrics such as cotton T-shirts and sweatshirts.

The apparatus 20 further includes a pair of thumb switches 124. In order to actuate the apparatus 20, the operator places one thumb in each thumb switch 124. A thumb switch that is suitable for this purpose is the ATDR-K6 thumb switch available from Banner Engineering Corp. located in Minneapolis, Minn.

Figure 3:
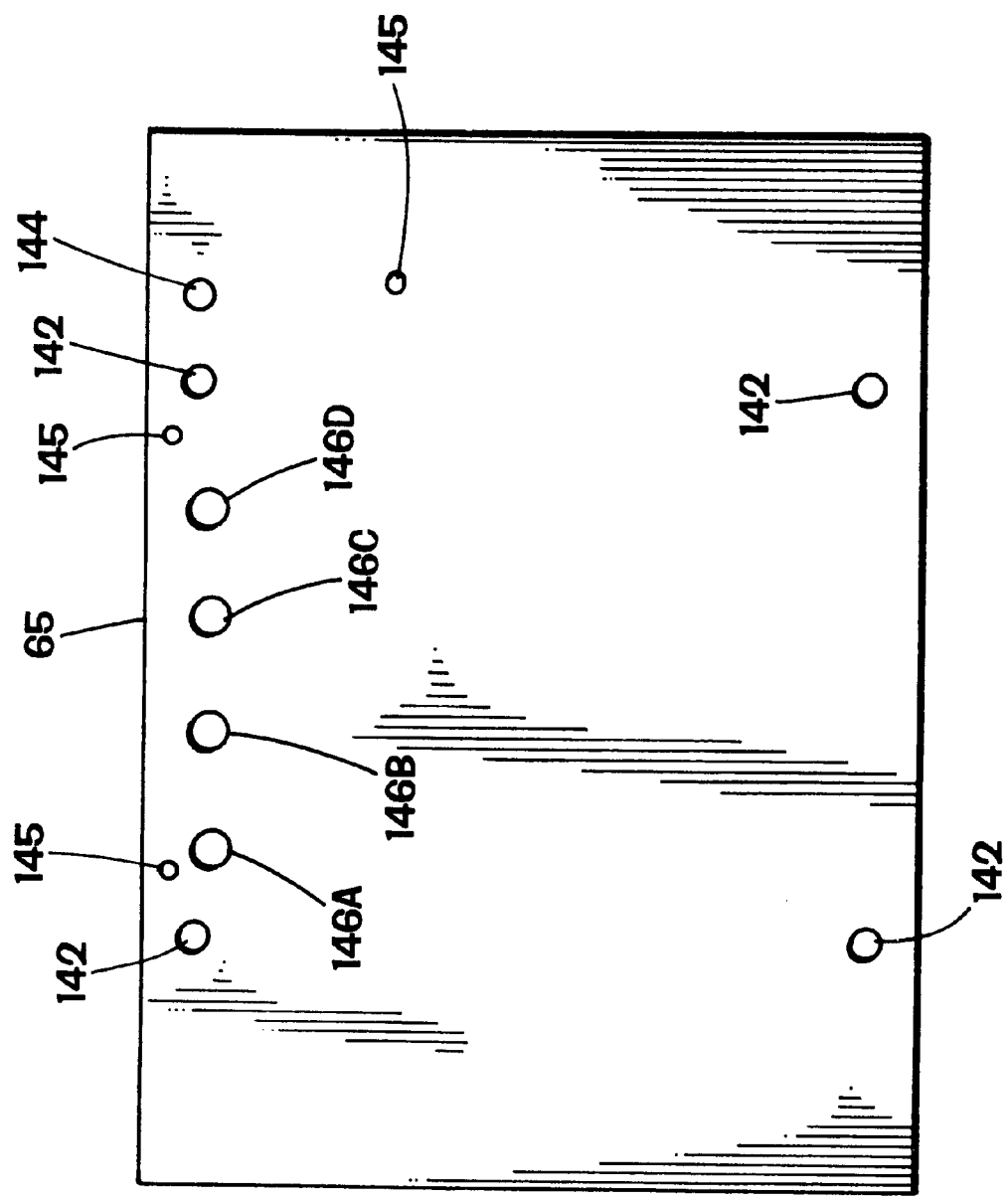
FIG. 3 is a plan view of a lower surface of the manifold shown in FIGS. 1 and 2.

Referring now to FIG. 3, a lower surface 140 of the manifold 54 is described in greater detail. The manifold 54 includes a set of four bolt holes 142 which are used to secure the upper mold plate 80 (FIG. 1) to the manifold 54 using bolts (not shown). The manifold 54 also includes a vacuum port 144 located near the side 65 of the manifold 54. The vacuum port 144 allows the vacuum 86 (FIG. 2) to establish the suction needed to hold the center mold plate 82 (FIG. 1) and the lower mold plate 84 (FIG. 1) against the upper mold plate 80 (FIG. 1).

Three tooling pins 145 project from the lower surface 140 of the manifold 54. The tooling pins 145 are long enough to extend below the upper mold plate 80 (FIG. 1) when the upper mold plate 80 (FIG. 1) is bolted to the manifold 54. The tooling pins 145 facilitate alignment of the center mold plate 82 and lower mold plate 84 (FIG. 1) with the upper mold plate 80 (FIG. 1) by the operator of the apparatus 20 (FIGS. 1 and 2).

The manifold 54 also includes four silicone output ports 146a–146d which correspond respectively to the silicone input ports 64a–64d (FIG. 2). Silicone that is injected into the silicone input ports 64a–64d (FIG. 2) flows into the mold assembly 78 (FIGS. 1 and 2) through the corresponding silicone output ports 146a–146d. In the example shown in FIG. 2, only the silicone input ports 64a and 64d are connected to sources of silicone. Accordingly, in this example, the silicone that is injected into the silicone input port 64a will flow through the manifold 54 and out the silicone output port 146a. Similarly, the silicone that is injected into the silicone input port 64d flows through the manifold 54 and out the silicone output port 146d. The silicone output ports 146b and 146c are not used in this example, however, all four silicone output ports 146a–146d may be used simultaneously to apply molded silicone design elements having four colors onto a substrate. Moreover, the number of silicone input ports and corresponding output ports may be increased if more colors are desired, although to do this it may be necessary to increase the size of the manifold 54.

Figure 4:
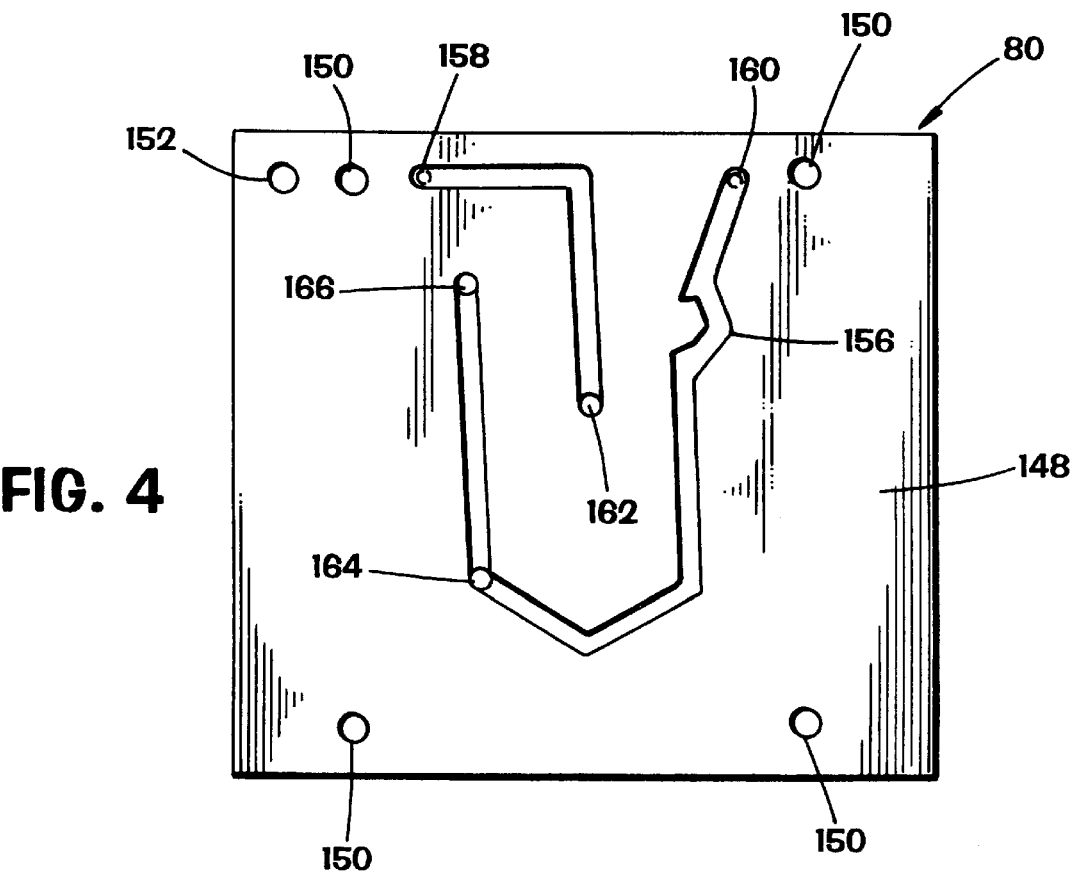
FIG. 4 is a plan view of an upper surface of the upper mold plate shown in FIG. 1.
Figure 5:
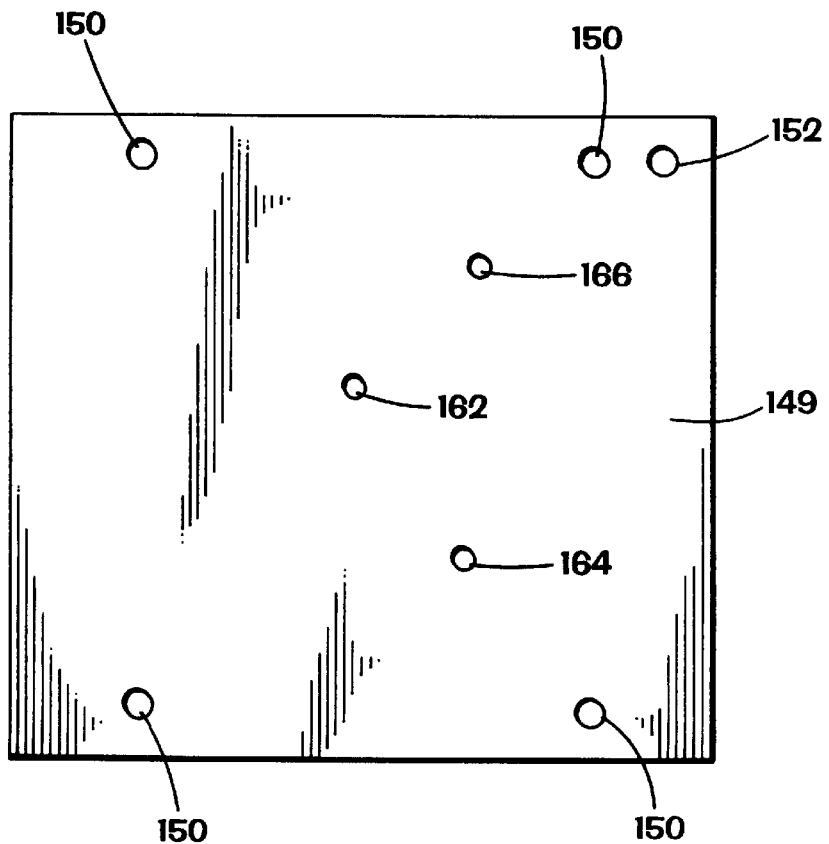
FIG. 5 is a plan view of a lower surface of the upper mold plate shown in FIG. 1.

Referring now to FIGS. 4 and 5 an upper surface 148 and a lower surface 149 of the upper mold plate 80 are described. The upper mold plate 80 has a set of four bolt holes 150 which extend through the upper mold plate 80. The bolt holes 150 register with the bolt holes 142 (FIG. 3) of the manifold 54 (FIG. 3). The bolt holes 150 are used to secure the upper mold plate 80 to the manifold 54 (FIG. 3) using bolts.

The upper mold plate 80 also includes a vacuum port 152 that registers with the vacuum port 144 (FIG. 3) of the manifold 54 (FIG. 3). The vacuum port 152 extends through the upper mold plate 80 to provide an air passage that allows the vacuum 86 (FIG. 2) to establish the suction required to hold the center mold plate 82 (FIG. 1) and lower mold plate 84 (FIG. 1) against the lower surface 149 of the upper mold plate 80.

The upper surface 148 of the upper mold plate 80 includes a gated runner system which, in the example shown in FIG. 4, comprises a first gated runner 154 and a second gated runner 156. The gated runner 154 receives silicone of a first color from the silicone output port 146a (FIG. 3) of the manifold 54 (FIG. 3). The silicone is received by the gated runner 154 at a location 158 that registers with the silicone output port 146a (FIG. 3). Similarly, the gated runner 156 receives silicone of a second color at a location 160 that registers with the silicone output port 146d (FIG. 3). The gated runners 158 and 160 are essentially cavities which are isolated from one another to prevent cross contamination of the differently colored silicone.

Silicone flows from the upper surface 148 to the lower surface 149 of the upper mold plate 80 through gates 162, 164 and 166. The gate 162 allows silicone of the first color to flow through the upper mold plate 80 to the center mold plate 82 (FIG. 1). The gates 164 and 166 allow silicone of the second color to flow through the upper mold plate 80 to the center mold plate 82 (FIG. 1).

The upper mold plate 80 is bolted to the manifold 54 (FIG. 3) using the bolt holes 142 (FIG. 3) and the bolt holes 150 to enable the upper mold plate 80 to withstand silicone being injected into the gated runners 158 and 160 at a pressure in the range from about 25 to about 200 psi, preferably about 74 psi.

Figure 6:
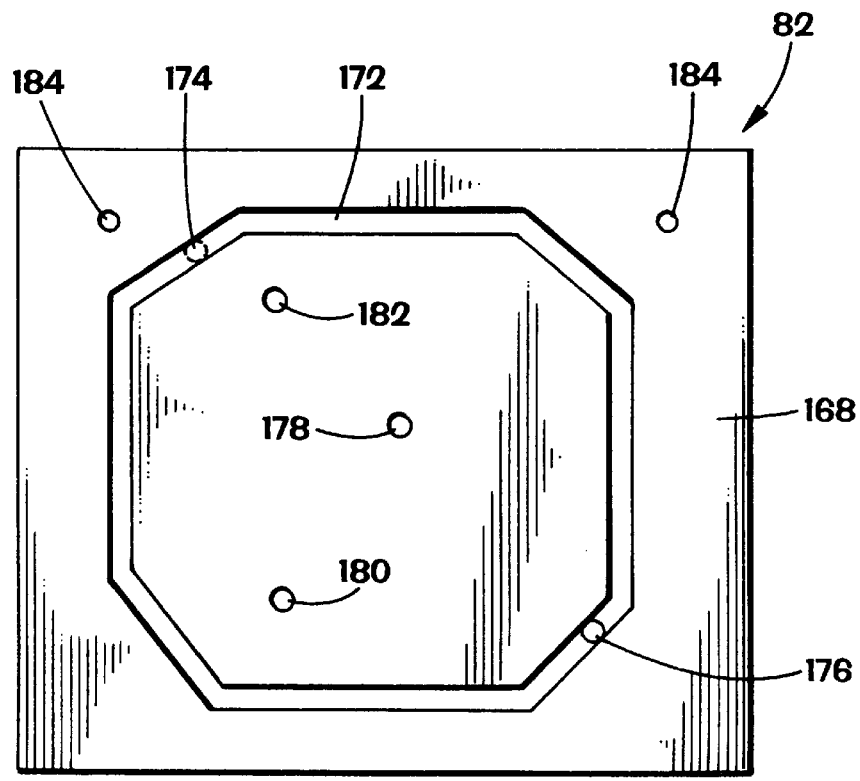
FIG. 6 is a plan view of an upper surface of the center mold plate shown in FIG. 1.
Figure 7:
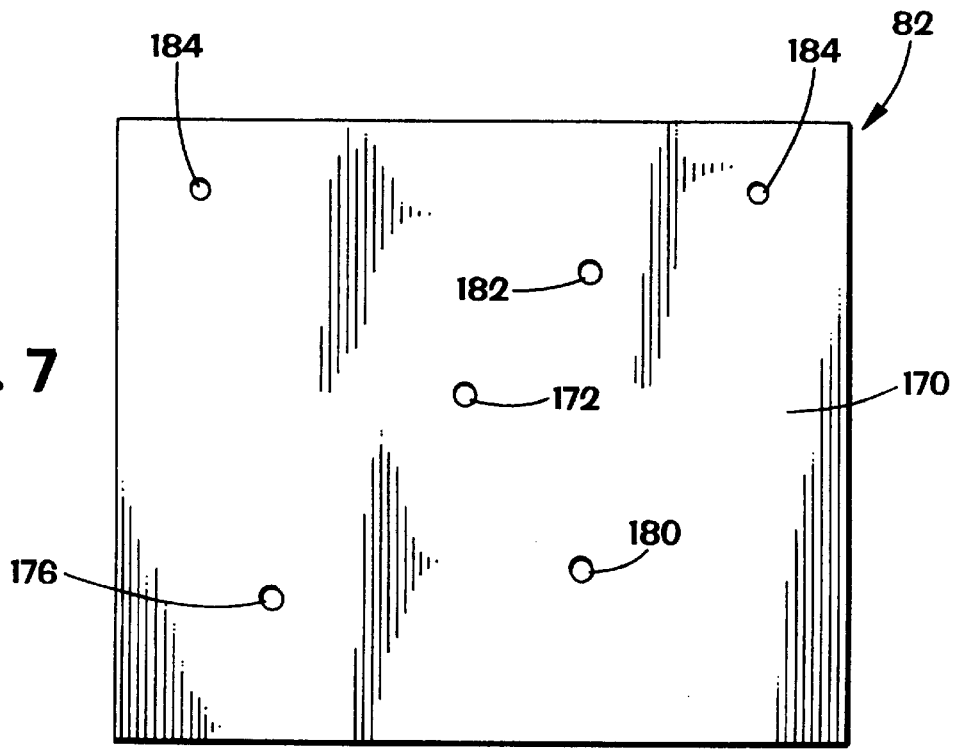
FIG. 7 is a plan view of a lower surface of the center mold plate shown in FIG. 1.

Referring now to FIGS. 6 and 7, an upper surface 168 and a lower surface 170 of the center mold plate 82 are described. The upper surface 168 of the center mold plate 82 includes a vacuum channel 172 that is aligned at a location 174 with the vacuum port 152 (FIGS. 4 and 5) of the upper mold plate 80 (FIGS. 4 and 5). The vacuum channel 172 provides an air passage that allows the vacuum 86 (FIG. 2) to establish the suction required to hold the center mold plate 82 against the lower surface 149 (FIG. 5) of the upper mold plate 80 (FIGS. 4 and 5). The vacuum channel 172 communicates with the lower surface 170 of the center mold plate 82 through a vacuum port 176.

The center mold plate 82 further includes gates 178, 180 and 182 which register respectively with the gates 162, 164 and 166 (FIGS. 4 and 5) of the upper mold plate 80 (FIGS. 4 and 5). The gate 178 allows silicone of the first color received through the gate 162 (FIG. 4) to flow through the center mold plate 82 to the lower mold plate 84 (FIG. 1). Similarly, the gates 180 and 182 allow silicone of the second color received through the gates 164 and 166 (FIGS. 4 and 5) to flow through the center mold plate 82 to the lower mold plate 84 (FIG. 1).

The center mold plate 82 further includes a pair of tooling pin holes 184. The tooling pin holes 184 receive tooling pins (described below in connection with FIG. 8) to facilitate alignment of the center mold plate 82 with the lower mold plate 84 (FIG. 1).

Figure 8:
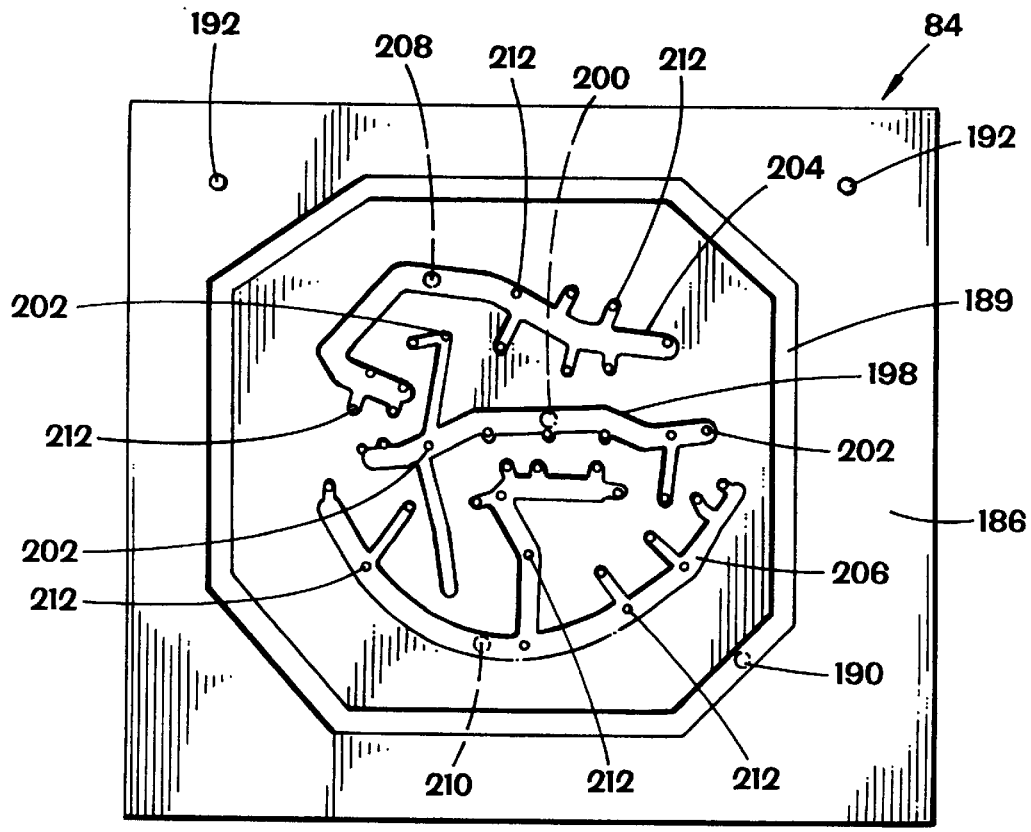
FIG. 8 is a plan view of an upper surface of the lower mold plate shown in FIG. 1.
Figure 9:
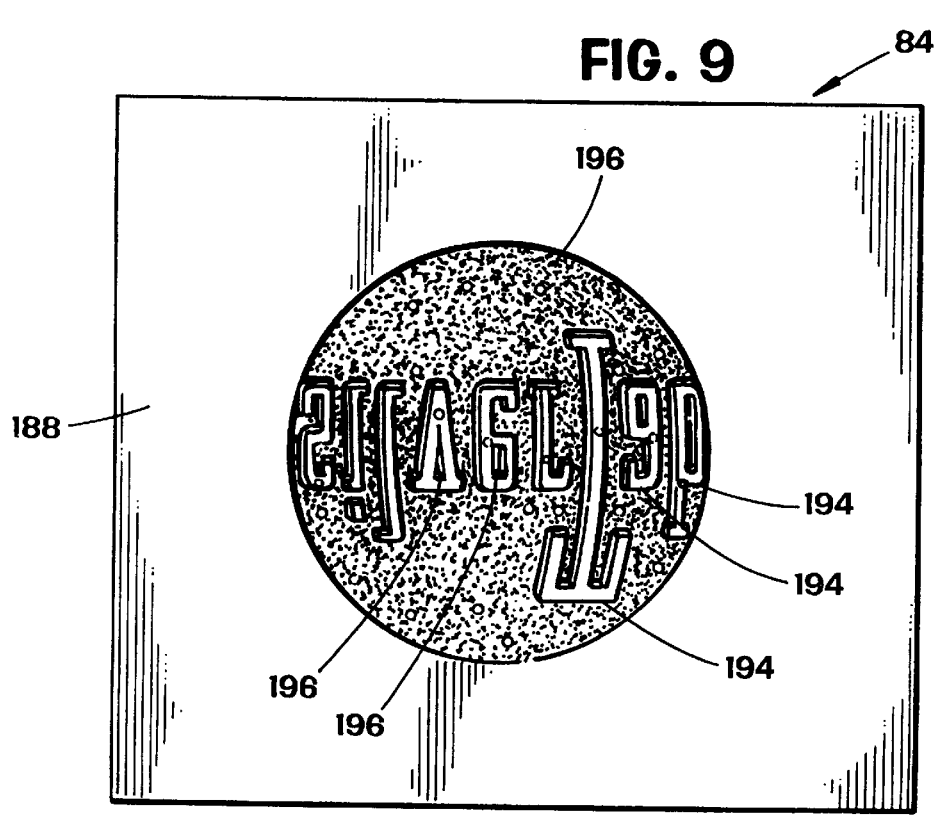
FIG. 9 is a plan view of a lower surface of the lower mold plate shown in FIG. 1.

Referring now to FIGS. 8 and 9, an upper surface 186 and a lower surface 188 of the lower mold plate 84 are described. The upper surface 186 of the lower mold plate 84 includes a vacuum channel 189 that is aligned at a location 190 with the vacuum port 176 (FIGS. 6 and 7) of the center mold plate 82 (FIGS. 6 and 7). The vacuum channel 189 provides an air passage that allows the vacuum 86 (FIG. 2) to establish the suction required to hold the lower mold plate 84 against the lower surface 170 (FIG. 7) of the center mold plate 82 (FIGS. 6 and 7). As mentioned above, the lower mold plate 84 includes a pair of tooling pins 192 which project from the upper surface 186. The tooling pins 192 register with the tooling pin holes 184 (FIGS. 6 and 7) of the center mold plate 82 (FIGS. 6 and 7) to facilitate alignment of the center mold plate 82 (FIGS. 6 and 7) with the lower mold plate 84.

The lower surface 188 of the lower mold plate 84 includes a plurality of foreground design cavities 194 which are intended to be filled, in this example, with silicone of the first color. The lower surface 188 also includes a plurality of background design cavities 196 that surround the foreground design cavities 194. Together the foreground design cavities 194 and the background design cavities 196 form an overall artistic design to be applied to a substrate as a molded silicone design element using the apparatus 20 (FIGS. 1 and 2). In the example shown in FIG. 9, the foreground design cavities 194 comprise letters having a depth of approximately 3.5 mm. The lower surface 188 preferably is cut such that the foreground design cavities 190 have sharply defined edges to prevent cross contamination of the foreground and background design colors and to ensure that the molded silicone design element formed using the lower mold plate 84 exhibits crisply defined contours.

The background design cavities 196 in this example comprise relatively shallow cavities having a depth of approximately 0.5 mm. The background design cavities 196 in this example are intended to be filled with silicone of the second color which preferably contrasts with the silicone of the first color that is injected into the foreground design cavities 194. The background design cavities 196 are preferably textured to improve the overall appearance of the molded silicone design element. Texturing may be accomplished by acid burning an image into the lower mold plate 84 using a negative.

The lower mold plate 84 uses a gated runner system to distribute silicone of multiple colors received from the gates 178, 180 and 182 (FIGS. 6 and 7) of the center mold plate 82 (FIGS. 6 and 7) to the foreground design cavities 194 and the background design cavities 196. A runner 198 receives silicone at a location 200 that registers with the gate 178 (FIGS. 6 and 7) of the center mold plate 82. From the runner 198, silicone of the first color flows through a plurality of small gates 202 to the foreground design cavities 194 to fill the foreground design cavities 194 with silicone of the first color when the lower surface 188 of the lower mold plate 84 is placed into tight engagement with the substrate.

Similarly, a pair of runners 204 and 206 receive silicone of the second color at locations 208 and 210 that register respectively with the gates 182 and 180 (FIGS. 6 and 7) of the center mold plate 82 (FIGS. 6 and 7). From the runners 204 and 206, silicone of the second color flows through a plurality of small gates 212 to fill the background design cavities 196 with silicone of the second color when the lower surface 188 of the lower mold plate 84 is placed into tight engagement with the substrate.

It should be understood that the particular arrangement of runners, gates, foreground design cavities, and background design cavities shown in FIGS. 4–9 is purely illustrative. Those skilled in the art will appreciate that the size, number and location of runners, gates, foreground design cavities, and background design cavities may be varied depending on factors such as the number of colors that are desired, the number of foreground and background design elements that are desired, and the size and overall complexity of the molded silicone design element that is desired.

The apparatus 20 shown in FIGS. 1 and 2 performs an automated process to apply molded silicone design elements onto substrates. To begin this process, an operator first places a suitable substrate (such as a T-shirt or a sweatshirt) on the backplate 30. The operator then connects the center mold plate 82 to the lower mold plate 84 by inserting the tooling pins 192 (FIG. 8) into the tooling pin holes 184 (FIGS. 6 and 7). The center mold pate 82 and the lower mold plate 84 are then placed against, and in alignment with, the upper mold plate 80. The operator achieves proper alignment of the mold plates by urging the connected center mold plate 82 and lower mold plate 84 against the tooling pins 145 (FIG. 3) that project from the lower surface 140 (FIG. 3) of the manifold 54.

While the center mold plate 82 and the lower mold plate 84 are being held against the upper mold plate 80, the operator actuates the vacuum 86 by depressing the foot pedal 92. The vacuum 86 then holds the center mold plate 82 and the lower mold plate 84 against the upper mold plate 80, thereby allowing the operator to release the mold plates. The operator then places a thumb in each of the thumb switches 124 to begin the injection/cure process of the apparatus 20.

Figure 10:
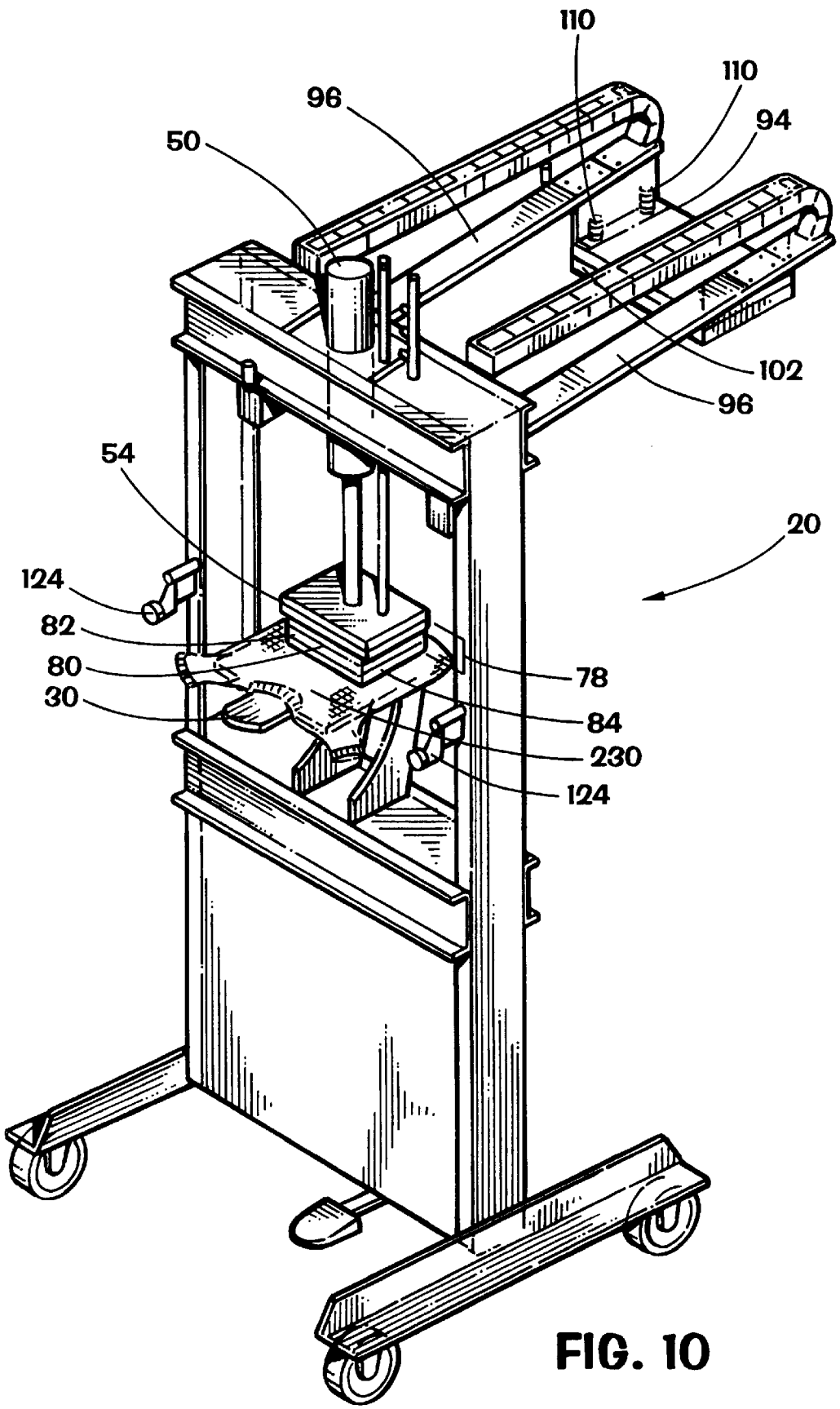
FIGS. 10–12 are perspective views of the apparatus shown in FIGS. 1 and 2, which illustrate the method of applying molded silicone design elements onto substrates in accordance with the principles of the present invention.

FIG. 10 depicts the apparatus 20 as it appears after the operator actuates the apparatus 20 using the thumb switches 124. A substrate 230 (in this example, a T-shirt) onto which a molded silicone design element is to be applied is positioned on the backplate 30. The air cylinder 50 lowers the manifold 54 and the attached mold assembly 78 so that the lower mold plate 84 tightly engages the substrate 230. Silicone of various colors is then injected into the mold assembly 78. The amount of silicone injected into the mold assembly 78 is regulated to ensure that the cavities (e.g., the foreground cavities 194 and the background cavities 196 of FIG. 9) formed in the lower surface 188 (FIG. 9) of the lower mold plate 84 are completely filled with silicone without overfilling.

The silicone is injected into the mold assembly 78 while the mold assembly 78 is at a temperature that is below the curing temperature of the injected silicone. This allows the silicone to be injected into the mold assembly 78 at low pressure to avoid damaging the substrate 230 while ensuring complete filling of the mold assembly 78. However, the heating plate 34 (FIGS. 1 and 2) disposed in the backplate 30 supplies heat to the lower surface of the substrate 230 while silicone is being injected into the mold assembly 78. The heat provided by the heating plate 34 (FIG. 1) causes the silicone at the silicone-substrate interface to rapidly cure to avoid complete penetration of the injected silicone through the substrate 230. This arrangement is particularly advantageous when the substrate 230 is a garment such as a T-shirt because it allows the surface of the garment opposite to the surface that receives the molded silicone design element to maintain the comfortable texture of the garment fabric.

Figure 11:
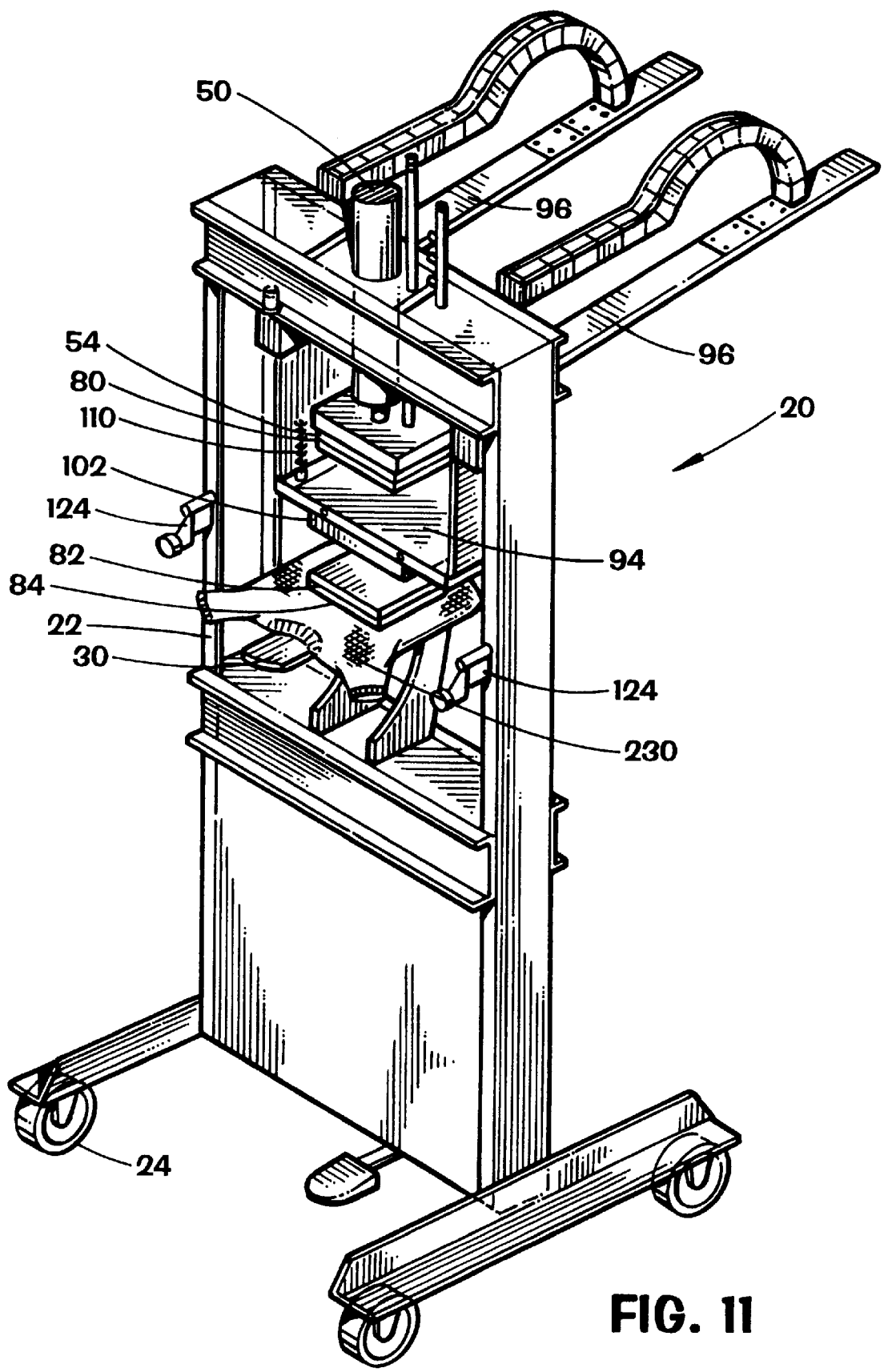

After the silicone has been injected into the mold assembly 78, the vacuum 86 (FIG. 2) releases the center mold plate 82 and the lower mold plate 84 from the upper mold plate 80 as the air cylinder 50 retracts the manifold 54 and the upper mold plate 80 to the raised position shown in FIG. 11. To ensure that the center mold plate 82 and the lower mold plate 84 remain on the substrate 230 as the air cylinder 50 retracts, the vacuum 86 (FIG. 2) emits a burst of air at the moment the air cylinder 50 begins to retract. At this stage, most of the silicone in the cavities of the lower mold plate 84 remains uncured. The cure unit 94 then advances along the rodless cylinders 96 to a position between the raised manifold 54 and the center mold plate 82, as shown in FIG. 11.

Figure 12:
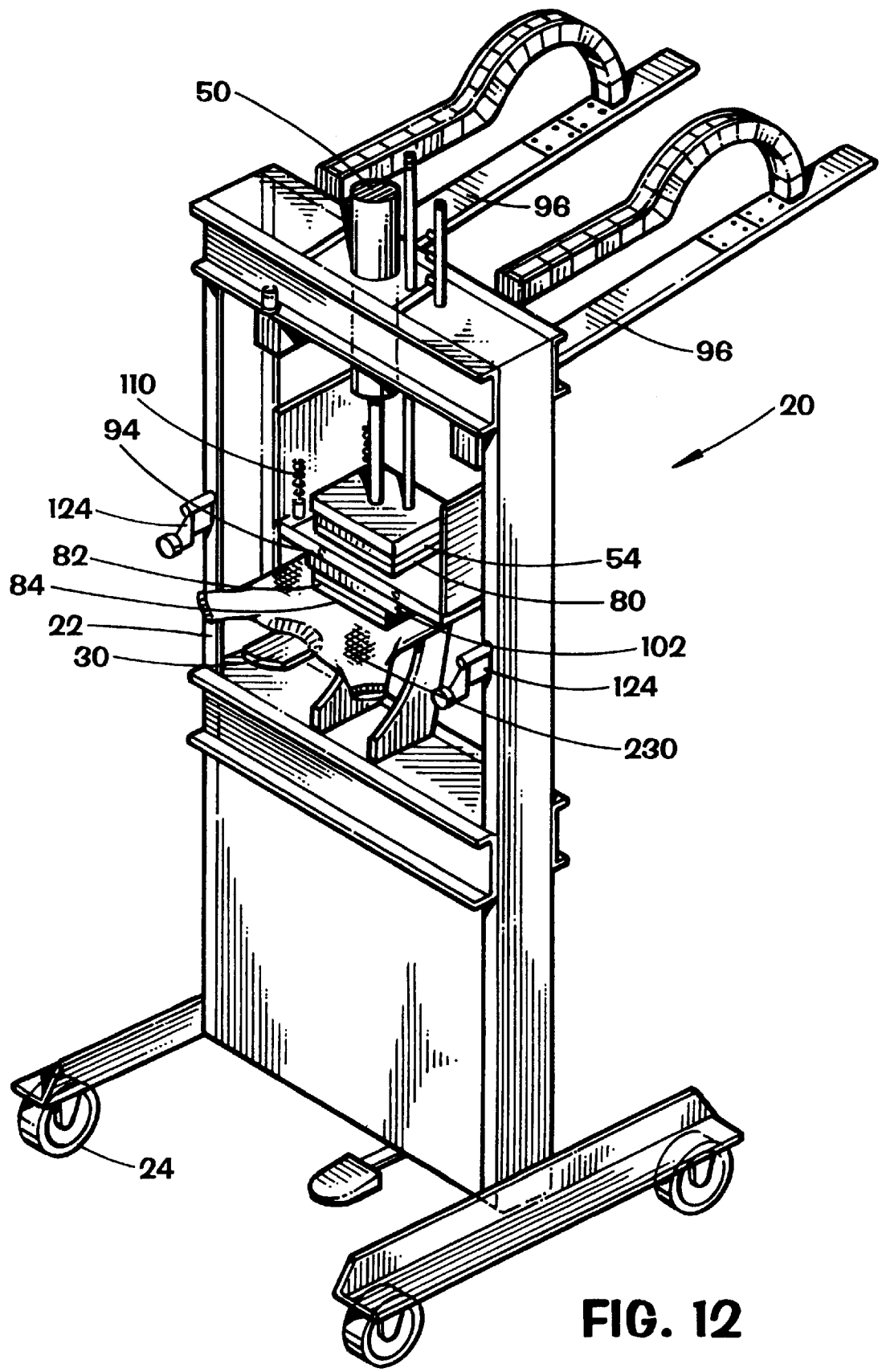

After the cure unit 94 reaches the position between the manifold 54 and the center mold plate 82, the air cylinder 50 lowers to urge the heating plate 102 of the cure unit 94 against the center mold plate 82, as shown in FIG. 12. The heat provided by the heating plate 102 heats the center mold plate 82 and the lower mold plate 84 to cause the silicone contained within the cavities of the lower mold plate 84 to cure. After a length of time sufficient to cure the silicone, the air cylinder 50 retracts. When the air cylinder 50 retracts, the springs 110 cause the cure unit 94 to lift away from the center mold plate 82 and the lower mold plate 84 which remain on the substrate 230. The cure unit then moves along the rodless cylinders 96 back to the position shown in FIG. 10.

The operator can then move the substrate 230, the center mold plate 82 and the lower mold plate 84 from the backplate 30 to a cooling station (not shown) which may be a cooling bath or other suitable cooling apparatus. After cooling, the center mold plate 82 and lower mold plate 84 can be removed from the substrate 230 and reused.

Figure 13:
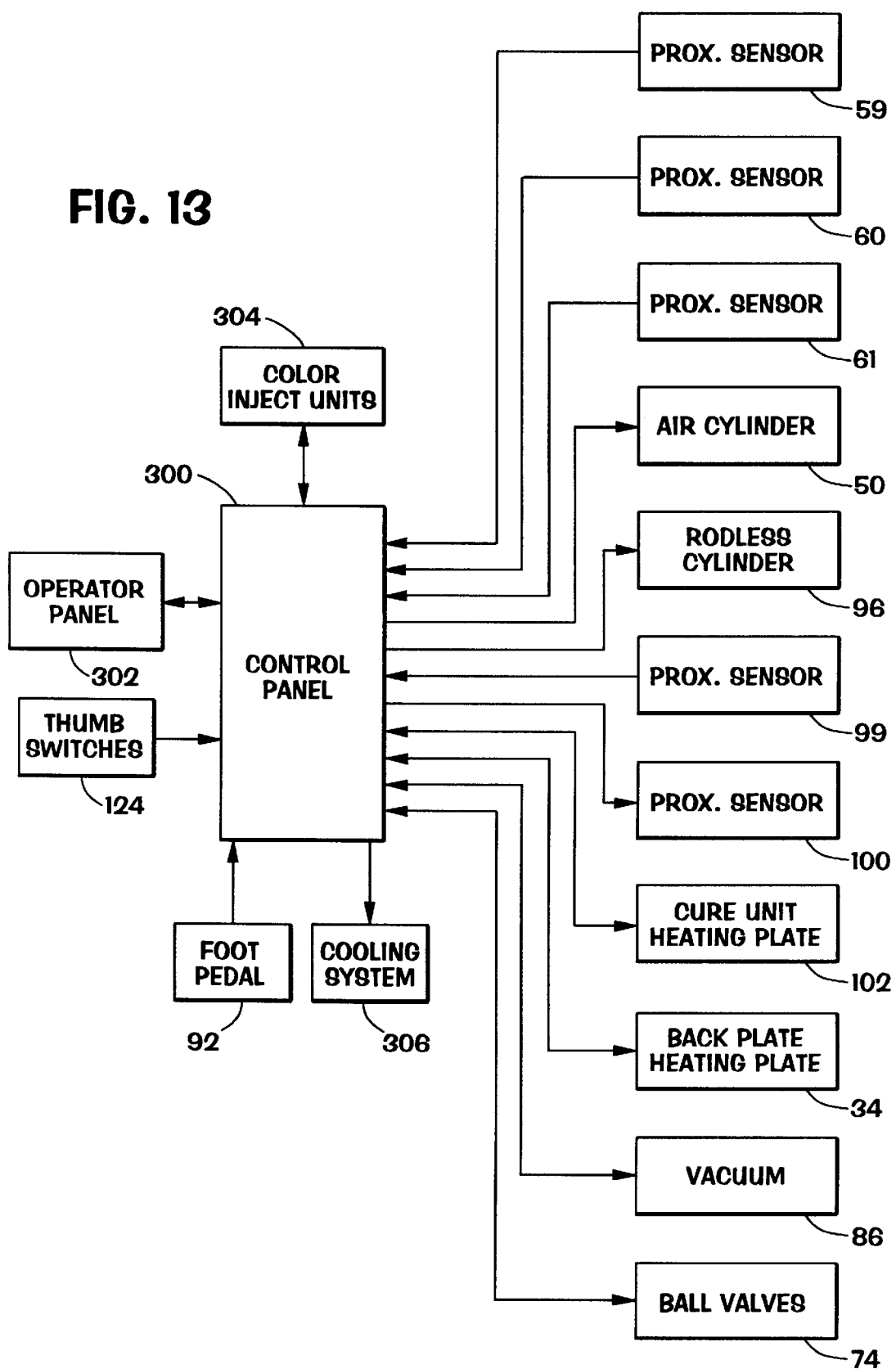
FIG. 13 is a block diagram representing a control system of the apparatus for applying molded silicone design elements onto substrates in accordance with the principles of the present invention.

Referring now to FIG. 13, a block diagram representing a control system for the apparatus 20 (FIGS. 1 and 2) is described. Several of the above-described components of the apparatus 20 (FIGS. 1 and 2) which are controlled by the control system described in connection with FIG. 13 are depicted as blocks in FIG. 13.

The apparatus 20 (FIGS. 1 and 2) is controlled by a control unit 300 that is based on a DL205 programmable logic controller manufactured by Koyo that is available from PLC Direct located in Cummings, Ga. The control unit 300 is preferably located in a suitable enclosure (not shown) in the apparatus 20 (FIGS. 1 and 2).

An operator panel 302 is coupled to the control unit 300. The operator panel 302 is preferably attached to the frame 22 (FIGS. 1 and 2) of the apparatus 20 (FIGS. 1 and 2) at a location that allows the operator to conveniently enter the parameters required by the control unit 300 to control the apparatus 20 (FIGS. 1 and 2). The operator panel 302 includes switches (not shown) that allow the operator to activate and deactivate the backplate heating plate 34 and the cure unit heating plate 102. The operator panel 302 also includes a keypad (not shown) that allows the operator to enter the parameters required by the control unit 300. These parameters include the temperature of the backplate heating plate 34, the temperature of the cure unit heating plate 102, the shot size for each color of silicone being used for a particular molded silicone design element, and the cure time. The operator panel 302 may also include status indicators (not shown) which inform the operator of the status of the apparatus 20 (FIGS. 1 and 2).

The control unit 300 is also coupled to the foot pedal 92 and the thumb switches 124. The control unit 300 senses when the operator depresses the foot pedal 92 and responds by actuating the vacuum 86. The control unit 300 also senses when the operator places a thumb in each of the thumb switches 124 and responds by lowering the air cylinder 50 to begin the inject/cure process of the apparatus 20 (FIGS. 1 and 2).

The control unit 300 also communicates with one or more color injects unit 304. As explained above, one color inject unit 304 is used for each color of silicone desired in a particular molded silicone design element. The color inject units 304 may include pneumatic ball valves (not shown) which are selectively opened and closed by the control unit 300 to control the injection/filling cycle of the color inject units 304. The control unit 300 controls the color inject units 304 by selectively opening and closing solenoid valves (not shown) which regulate the flow of air to the pneumatic ball valves (not shown). The color inject units 304 may also include linear potentiometers (not shown) or other suitable sensors which provide an indication to the control unit 300 of the amount of silicone injected by the color inject units 304.

The control unit 300 controls the movement of the air cylinder 50 by selectively opening and closing solenoid valves (not shown) which regulate the flow of air to the air cylinder 50. The control unit 300 also controls the movement of the cure unit 94 (FIGS. 1 and 2) on the rodless cylinders 96 by selectively opening and closing solenoid valves (not shown) which regulate the flow of air to the rodless cylinders 96.

The control unit 300 receives signals from the proximity sensors 59, 60, 61, 99 and 100. Signals provided by the proximity sensors 59, 60 and 61 are used by the control unit 300 to determine the vertical position of the air cylinder 50. Signals provided by the proximity sensors 99 and 100 are used by the control unit 300 to determine the horizontal position of the cure unit 94 (FIGS. 1 and 2) on the rodless cylinders 96.

The control unit 300 also controls the temperatures of the backplate heating plate 34 and the cure unit heating plate 102 in accordance with the temperature settings entered by the operator into the operator panel 302. Each of the heating plates 34 and 102 include a thermocouple (not shown) that provides an indication of temperature to the control unit 300.

The control unit 300 also controls the ball valves 74 to regulate the amount of silicone injected into the manifold 54 (FIGS. 1 and 2). The control unit 300 controls the ball valves 74 by selectively opening and closing solenoid valves (not shown) which regulate the flow of air into the ball valves 74. The control unit 300 also controls the vacuum 86 by selectively opening and closing solenoid valves (not shown) which regulate the flow of air into the vacuum 86.

The control unit 300 also controls a cooling system 306. When the operator actuates the backplate heating plate 34 or the cure unit heating plate 102, the control unit 300 causes the cooling system 306 to open a valve (not shown) which allows water to flow through the perimeter plate 36 (FIGS. 1 and 2) and the manifold 54 (FIGS. 1 and 2).

Figure 14:
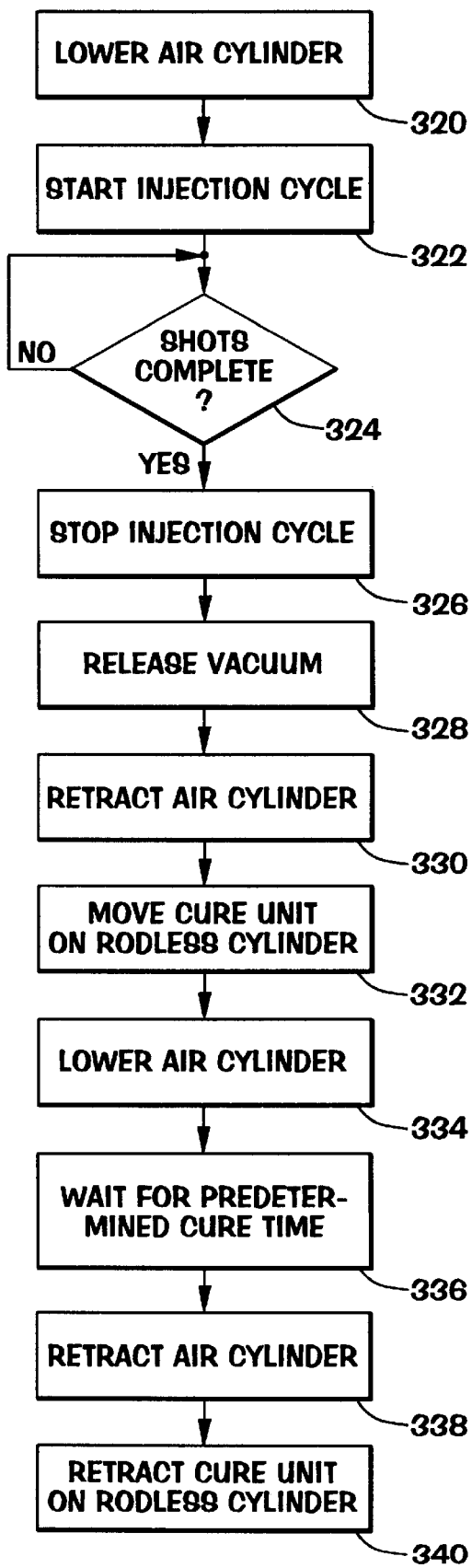
FIG. 14 is a process flow diagram representing a process performed by the control system shown in FIG. 13 to control the apparatus for applying molded silicone design elements onto substrates in accordance with the principles of the present invention.

Referring now to FIG. 14, a process flow diagram is described that represents a process performed by the control unit 300 shown in FIG. 13 to control the apparatus 20 (FIGS. 1 and 2). Before the process shown in FIG. 14 is performed, the operator first enters the above-described parameters into the operator panel 302 (FIG. 13). The operator panel 302 provides a visual indication that the backplate heating plate 34 (FIG. 13) and the cure unit heating plate 102 (FIG. 13) have reached the temperatures set by the operator. Once the proper temperatures have been reached, the operator can depress the foot pedal 92 (FIG. 13) to cause the control unit 300 (FIG. 13) to actuate the vacuum 86 (FIG. 13) to hold the center mold plate 82 (FIG. 1) and the lower mold plate 84 (FIG. 1) against the upper mold plate 80 (FIG. 1).

The process shown in FIG. 14 begins when the operator places a thumb in each of the two thumb switches 124 (FIG. 13). At step 320, the control unit 300 (FIG. 13) lowers the air cylinder 50 (FIG. 13) to place the mold assembly 78 (FIG. 10) into tight engagement with the substrate 230 (FIG. 10). The proximity sensor 61 (FIG. 13) provides a signal to the control unit 300 (FIG. 13) when the air cylinder 50 (FIG. 13) is properly positioned. The signal from the proximity sensor 61 (FIG. 13) causes the control unit 300 (FIG. 13) to start the silicone injection cycle at step 322. If the operator removes a thumb from either of the thumb switches 124 (FIG. 13) before the signal from the proximity sensor 61 (FIG. 13) is received by the control unit 300 (FIG. 13), the control unit 300 (FIG. 13) raises the air cylinder 50 (FIG. 13) and terminates the process.

At step 322, the control unit 300 (FIG. 13) opens the ball valves 74 (FIG. 13) and causes the color inject units 304 (FIG. 13) to begin injecting silicone into the mold assembly 78 (FIG. 10). At test 324, the control unit 300 (FIG. 13) determines, for each color of silicone being used, if the proper amount of silicone has been injected into the mold assembly 78 (FIG. 10). The control unit 300 accomplishes this by monitoring the signals provided by the color inject units 304 (FIG. 13) to determine the volume of silicone injected and comparing this information to the shot sizes previously programmed into the control unit 300 (FIG. 13) by the operator. The test 324 is performed continually for each color of silicone being used until the control unit 300 (FIG. 13) determines that the proper amount of silicone of each color has been injected.

Once the control unit 300 (FIG. 13) determines that the proper amount of silicone of a particular color has been injected, step 326 is performed at which the control unit 300 (FIG. 13) causes the appropriate color inject unit 304 (FIG. 13) to stop injecting silicone and closes the appropriate ball valve 74 (FIG. 13). It should be understood that silicone of different colors may be used in different amounts; therefore, the control unit 300 (FIG. 13) may perform step 326 at different times for different colors. The color inject units 304 (FIG. 13) then refill with silicone in preparation for subsequent silicone shots.

At step 328, the control unit 300 (FIG. 13) deactivates the vacuum 86 (FIG. 13). At step 330, the control unit 300 (FIG. 13) raises the air cylinder 50 (FIG. 13) to its original, elevated position. Preferably, the vacuum 86 (FIG. 13) emits a short burst of air at the moment that the air cylinder 50 (FIG. 13) begins to rise to ensure that the center mold plate 82 (FIG. 11) and the lower mold plate 84 (FIG. 11) remain on the substrate 230 (FIG. 11). The proximity sensor 59 (FIG. 13) provides a signal to the control unit 300 (FIG. 13) when the air cylinder 50 (FIG. 13) is in its original position.

The signal from the proximity sensor 59 (FIG. 13) causes the control unit 300 (FIG. 13) to move the cure unit 94 (FIG. 11) along the rodless cylinders 96 (FIG. 13) to a position between the raised air cylinder 50 (FIG. 11) and the center mold plate 82 (FIG. 11) at step 332. The proximity sensor 100 (FIG. 13) provides a signal to the control unit 300 (FIG. 13) when the cure unit 94 (FIG. 11) has reached the position between the air cylinder 50 (FIG. 11) and the center mold plate 82 (FIG. 11).

In response to the signal from the proximity sensor 100 (FIG. 13), the control unit 300 (FIG. 13) lowers the air cylinder 50 (FIG. 13) at step 334. The air cylinder 50 (FIG. 13) is lowered to push the cure unit 94 (FIG. 12) against the center mold plate 82 (FIG. 12). Heat provided by the heating plate 102 (FIG. 12) cures the silicone contained in the center mold plate 82 (FIG. 12) and the lower mold plate 84 (FIG. 12). It should be noted that before the cure unit 94 (FIG. 12) is pressed against the center mold plate 82 (FIG. 12), the heat provided by the heating plate 34 (FIGS. 1 and 2) cures a small amount of the silicone at the silicone-substrate interface to prevent bleeding of the silicone through the surface of the substrate 230 (FIG. 12) facing the backplate 30 (FIG. 12).

A signal from the proximity sensor 60 (FIG. 13) informs the control unit 300 (FIG. 13) that the cure unit 94 (FIG. 12) is properly positioned against the center mold plate 82 (FIG. 12). After receiving this signal, the control unit 300 (FIG. 13) waits at step 336 until the cure time previously programmed by the operator has lapsed. The cure time is generally set to be in the range from about 15 seconds to about 2 minutes, depending on the amount of silicone being cured. The control unit 300 (FIG. 13) then retracts the air cylinder 50 (FIG. 13) at step 338. After the control unit 300 (FIG. 13) receives a signal from the proximity sensor 59 (FIG. 13) indicating that the air cylinder has been completely retracted, the control unit 300 (FIG. 13) retracts the cure unit 94 (FIGS. 1 and 2) on the rodless cylinders 96 (FIG. 13) at step 340. When the control unit 300 (FIG. 13) receives a signal from the proximity sensor 99 (FIG. 13) indicating that the cure unit 94 (FIGS. 1 and 2) has been completely retracted, the apparatus 20 (FIGS. 1 and 2) may be used again to apply another molded silicone design element on another substrate.

Figure 15:
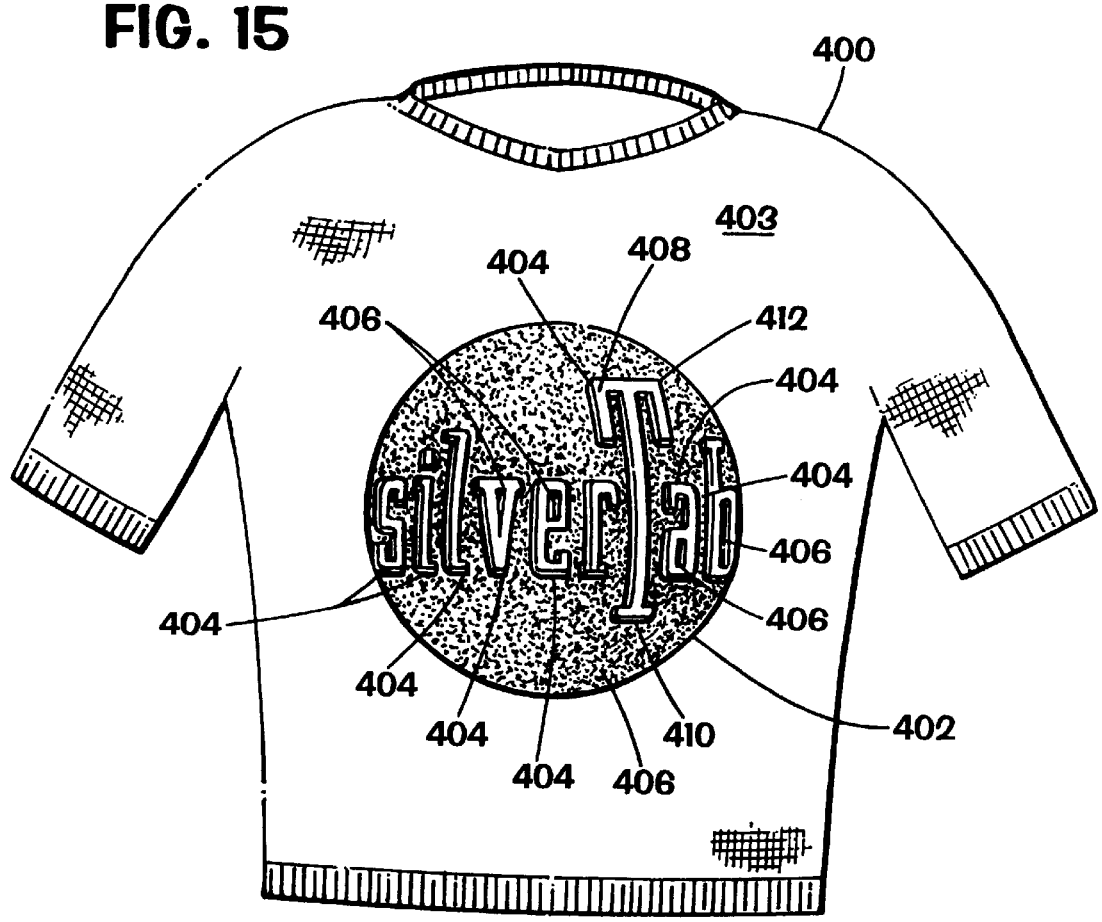
FIG. 15 is a perspective view of a substrate having a molded silicone design element applied thereon in accordance with the principles of the present invention.

FIG. 15 depicts a substrate 400 having a molded silicone design element 402 applied thereon using the apparatus 20 (FIGS. 1 and 2) of the present invention. The design element 402 is a three-dimensional design that projects from an upper surface 403 of the substrate 400. The design element 402 includes a plurality of raised foreground elements 404 (which in this example are letters) of a first color surrounded by a plurality of background elements 406 of a second color. As explained above, the apparatus 20 (FIGS. 1 and 2) may be modified to provide molded silicone design elements having more than two colors, if desired. The foreground elements 404 have a height of about 3.5 mm. The background elements 406 are textured and have a height of about 0.5 mm. It should be understood that elements of many different heights, shapes and colors can be combined to form a molded silicone design element in accordance with the principles of the present invention. For example, the apparatus 20 (FIGS. 1 and 2) can be used to create three-dimensional, multi-colored, textured, design elements in the shapes of sporting equipment (e.g., footballs, basketballs, baseballs, soccer balls, etc.), animated characters including team mascots, and corporate symbols, among others.

In the example shown in FIG. 15, the foreground elements 404 have a flat upper surface 408, a flat peripheral surface 410, and a sharp edge 412 where the flat upper surface 408 and the flat peripheral surface 410 meet. An angle of about ninety degrees (90°) is formed between the flat upper surface 408 and the flat peripheral surface 410. Obtuse angles and acute angles may also be formed. Design elements having curved edges may also be applied to the substrate 400 using the apparatus 20 (FIGS. 1 and 2).

Figure 16:
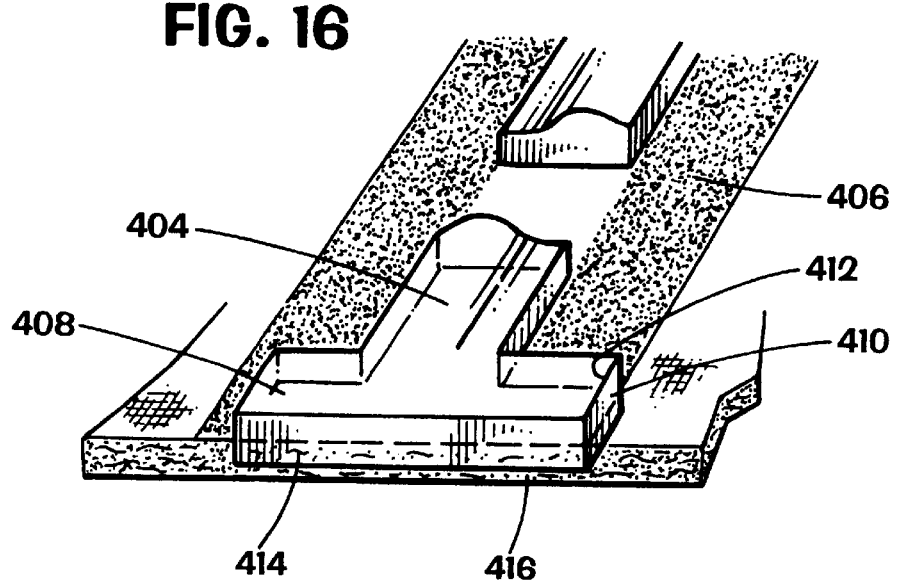
FIG. 16 is a cross-sectional view of the substrate and molded silicone design element shown in FIG. 15.

FIG. 16 is a cross-sectional view of one of the foreground elements 404 shown in FIG. 15. FIG. 16 illustrates that the weave of the substrate 400 is impregnated with silicone 414 that forms the molded silicone design element 402. This ensures a firm attachment of the design element 402 to the substrate 400. However, the silicone 414 does not bleed through a lower surface 416 of the substrate 400. This is desirable, particularly for garments, because the lower surface 416 maintains a cloth-like texture which may be more comfortable than silicone when the lower surface 416 is placed against skin.

LIM silicone has been found to be particularly suitable for use in applying molded design elements onto substrates in accordance with the principles of the present invention because cured silicone is durable, flexible and proportionally light-weight. Other polymeric materials which exhibit similar properties may be used as alternatives.

Thus an apparatus and a method for applying molded silicone design elements onto substrates are provided. One skilled in the art will appreciate that the present invention can be practiced by other than the described embodiments, which are presented for purposes of illustration and not of limitation, and the present invention is limited only by the claims which follow.

What is claimed is:

1. A method of applying a molded design element onto a substrate, comprising:

placing an injection mold having at least one open cavity into tight engagement with the substrate such that the at least one open cavity communicates with a first surface of the substrate;

injecting a thermosetting material into the at least one open cavity of the mold to fill the mold while the mold is at a temperature below the curing temperature of the thermosetting material so that said thermosetting material penetrates said first surface of the substrate and forms a substrate-thermosetting material interface;

supplying heat to a second surface of the substrate during said step of injecting the thermosetting material to cause the thermosetting material to cure in said interface and preventing bleeding of the injected thermosetting material through said second surface; and supplying heat to the mold after the thermosetting material is injected into the mold, the heat supplied to the mold being sufficient to cure remaining thermosetting material within the mold, the cured thermosetting material adhering to the substrate to form the molded design element.

2. The method of claim 1, wherein:

the mold comprises a plurality of separated, open cavities;

the step of injecting thermosetting material comprises injecting thermosetting material of a plurality of colors into the separated, open cavities such that each of the separated, open cavities contains said thermosetting material of one of the plurality of colors; and the step of supplying heat to the mold comprises curing the thermosetting material of each of the plurality of colors to form a multi-colored molded design element.

3. The method of claim 1, wherein the thermosetting material penetrates the substrate before the curing of the thermosetting material.

4. The method of claim 3, wherein the thermosetting material partially penetrates the substrate before the curing of the thermosetting material.

5. The method of claim 1, wherein the thermosetting material comprises silicone.

6. The method of claim 1, wherein the substrate comprises a fabric.

7. The method of claim 1, wherein the substrate comprises a garment.

8. The method of claim 1, wherein the substrate comprises paper.

9. The method of claim 1, wherein molded design element is textured.

10. The method of claim 1, wherein the molded design element is three-dimensional.

* * * * *